(12) United States Patent
Amundsen et al.

(10) Patent No.: US 11,269,093 B2
(45) Date of Patent: *Mar. 8, 2022

(54) METHOD AND SYSTEM FOR GENERATING GEOPHYSICAL DATA

(71) Applicant: EQUINOR ENERGY AS, Stavanger (NO)

(72) Inventors: Lasse Amundsen, Trondheim (NO); Johan Olof Anders Robertsson, Wald (CH)

(73) Assignee: EQUINOR ENERGY AS, Stavanger (NO)

( * ) Notice: Subject to any disclaimer, the term of this patent is extended or adjusted under 35 U.S.C. 154(b) by 0 days.

This patent is subject to a terminal disclaimer.

(21) Appl. No.: 16/998,085

(22) Filed: Aug. 20, 2020

(65) Prior Publication Data

US 2020/0393582 A1    Dec. 17, 2020

Related U.S. Application Data

(63) Continuation of application No. 15/764,461, filed as application No. PCT/NO2016/050197 on Sep. 30, 2016, now Pat. No. 10,788,596.

(30) Foreign Application Priority Data

Oct. 1, 2015   (GB) ..................... 1517387

(51) Int. Cl.
*G01V 1/00*   (2006.01)
*G01V 3/00*   (2006.01)
(Continued)

(52) U.S. Cl.
CPC ............. *G01V 1/005* (2013.01); *G01V 3/00* (2013.01); *G01V 1/364* (2013.01); *G01V 1/37* (2013.01);
(Continued)

(58) Field of Classification Search
CPC ...... G01V 3/00; G01V 1/005; G01V 2210/47; G01V 2210/46; G01V 1/37; G01V 3/083; G01V 1/364; G01V 2210/43
(Continued)

(56) References Cited

U.S. PATENT DOCUMENTS 4,417,210 A     11/1983   Rocroi et al.
10,788,596 B2*  9/2020    Amundsen ............ G01V 1/005
(Continued)

FOREIGN PATENT DOCUMENTS

EP    0 051 916 A1    5/1982
WO    02097474 A1    12/2002
(Continued)

OTHER PUBLICATIONS

International Search Report and Written Opinion, PCT/NO2016/050197, dated Dec. 22, 2016 (11 pgs.).
(Continued)

*Primary Examiner* — John H Le
(74) *Attorney, Agent, or Firm* — Eversheds Sutherland (US) LLP

(57) ABSTRACT

A method of generating geophysical data using at least one source. The method may include the steps of generating a geophysical wavefield with a varying signature using at least one source, wherein the signature is varied in a periodic pattern.

26 Claims, 12 Drawing Sheets

(51) Int. Cl.
*G01V 1/37* (2006.01)
*G01V 3/08* (2006.01)
*G01V 1/36* (2006.01)

(52) U.S. Cl.
CPC .......... *G01V 3/083* (2013.01); *G01V 2210/43* (2013.01); *G01V 2210/46* (2013.01); *G01V 2210/47* (2013.01)

(58) Field of Classification Search
USPC .......................................................... 702/2
See application file for complete search history.

(56) References Cited

U.S. PATENT DOCUMENTS

| | | |
|---|---|---|
| 2010/0004868 A1 | 1/2010 | Lovatini |
| 2012/0314536 A1 | 12/2012 | Bagaini |
| 2014/0278119 A1 | 9/2014 | Halliday et al. |
| 2014/0286125 A1 | 9/2014 | Quigley |
| 2016/0202378 A1 | 7/2016 | Ridsdill-Smith |

FOREIGN PATENT DOCUMENTS

| | | |
|---|---|---|
| WO | 2014161044 A1 | 10/2014 |
| WO | 2015001058 A2 | 1/2015 |
| WO | 2015028411 A1 | 3/2015 |

OTHER PUBLICATIONS

Notification of the Recording of a Change, PCT/NO2016/050197, Nov. 14, 2017 (1 pg.).
Search Report, GB15173875, dated Mar. 10, 2016 (3 pp.).
Berkhout, A.J., Blended acquisition with dispersed source arrays, Geophysics, 77(4), A19-A23, 2012 (5 pp.).
Ozbek, A., et al., Interpolation of matching pursuit, 2009 SEG Annual Meeting, Society of Exploration Geophysicists, Jan. 2009 (5 pp.).
Ozbek, A., et al., Crossline wavefield reconstruction from multicomponent streamer data: Part 2—Joint interpolation and 3D up/down spartion by generalized matching pursuit, Geophysics, 75(6), WB69-WB85, 2010 (17 pp.).
Robertsson, J.O.A., et al., On the use of multicomponent streamer recordings for reconstruction of pressure wavefields in the crossline direction, Geophysics, 73, A45-A49, 2008 (5 pp.).
Spitz, S., Seismic trace interpolation in the FX domain, Geophysics, 56(6), 785-794, 1991 (10 pp.).
Vassallo, M., et al., Crossline wavefield reconstruction from multicomponent streamer data: Part 1—Multichannel nterpolation by matching pursuit (MIMA) using pressure and its crossline grdient, Geophysics, 75(6), WB53-WB67, 2010 (15 pp.).
Yilmaz, Seismic Data Analysis: Processing, Inversion, and Interpretation of Seismic Data, Investigations in Geophysics: SEG, Chapter 1, 2001 (100 pp.). [PART 1].
Yilmaz, Seismic Data Analysis: Processing, Inversion, and Interpretation of Seismic Data, Investigations in Geophysics: SEG, Chapter 1, 2001 (77 pp.). [PART 2].
Search Report, EP 16898763.4-1005, dated Apr. 1, 2019 (12 pgs.).

* cited by examiner

METHOD AND SYSTEM FOR GENERATING GEOPHYSICAL DATA

RELATED CASES

The present application is a continuation of U.S. application Ser. No. 15/764,461, filed on Mar. 29, 2018, now allowed, which is a National Stage Entry of PCT/NO2016/050197, filed on Sep. 30, 2016, both of which are incorporated herein in full.

TECHNICAL FIELD

The present invention relates to a method and system for generating geophysical data.

BACKGROUND OF THE INVENTION

When generating geophysical data, a geophysical wavefield is typically generated by a source. Examples of known sources are single airguns and airgun arrays, single vibrators and vibrator arrays, waterguns, dynamite, and electric and magnetic sources. Geophysical energy is then recorded by a receiver at a location distant from the source. The geophysical data recorded by the receiver typically comprises a portion of data from the geophysical wavefield generated by the source, and may also comprise geophysical data not originating from the source (e.g. noise, interference and/or geophysical energy from another active or passive source). It is desirable to know which part(s) of the geophysical data recorded by the receiver originate from the source. In the prior art, attempts have been made to do this by using sources with random time dithers or by encoding sources using orthogonal sequences.

In US 2014/0278119, a technique is employed where phases of frequency sweeps are varied from shot to shot.

However, the present inventors have devised an improved method and system for generating geophysical data.

SUMMARY OF THE INVENTION

In a first aspect, the invention provides a method of generating geophysical data using at least one source, the method comprising generating a geophysical wavefield with a varying signature using at least one source, wherein the signature is varied in a periodic pattern.

The inventors have found that varying the signature of the generated geophysical wavefield in a periodic pattern can greatly improve: the efficiency of geophysical data acquisition, the efficiency of geophysical modelling, interference cancellation, noise reduction, deghosting and the accuracy of source-side gradient calculations. These improvements are discussed in greater detail below.

As discussed above, a geophysical wavefield is typically generated by a source. The source can produce a geophysical wavefield at intervals in time, which may be regular intervals in space and/or in time. The generation of the wavefield is typically referred to as a "shot". A receiver records geophysical energy, the energy comprising the generated wavefield. The receiver typically records the geophysical energy in a number of traces that are sequential in time with respect to each other. The receiver is typically triggered with the source such that the receiver starts recording each trace when a shot is fired, e.g. when a shot is fired a new trace is recorded. In this way, the receiver records a trace for each shot fired. Alternatively, it may be that a geophysical wavefield is continuously generated by the source and that data is continuously recorded by the receiver. In this case, the generated wavefield and the received data may be divided into time segments. These segments may also be referred to as shots, and may be treated equivalently to discrete shots.

A plurality of receivers at varying locations are typically used. The receiver typically records the geophysical wavefield in the time-space domain.

When no periodic signature pattern is used, the inventors have observed that if the recorded geophysical data is transformed into another domain (such as frequency-wavenumber), substantially all of the data is located in only a portion of the space of that domain, i.e. there are portions of the space of that domain where substantially no data exists. For instance, when no periodic signature pattern is used and the recorded data is transformed into the frequency-wavenumber domain, all of the data fall within a signal cone centred around wavenumber k=0. At all locations in the domain outside of the signal cone and up to the Nyquist wavenumber $k_N$, there is no geophysical data. This is described in more detail below with reference to FIG. 1.

The inventors have realised that if it were possible to move at least some of the data from a particular source recorded at a receiver to a different location in the other domain, then more of the space in the other domain could be used.

The inventors have also realised that this could allow for the use of multiple simultaneous sources, for example, with the data from each source having its own location in the other domain. Since data from each source could have its own location in the other domain, it is possible to know which data came from which source, and it is possible to separate the data from each source. This allows for greater density of data sampling, and hence greater efficiency. Similarly, the inventors have realised that when data from each source has its own location in the other domain, then the recorded data can be directly filtered in the domain in which it is recorded (e.g. time-space or frequency-space domain) to extract or reject data from each source.

The inventors also realised that similar principles could also be used to move the data signal in the other domain to a location away from data recorded from noise and/or interference, or equivalently move noise and/or interference away from the data signal. The data from the noise and/or interference could then be used or removed. Equivalently, the data could be filtered in the first domain (i.e. the domain in which it is recorded) to remove the noise and/or interference.

There may also be numerous other uses and benefits associated with being able to move data in the other domain.

The inventors discovered that by using a periodic varying signature on the generated geophysical wavefield, the data recorded from that wavefield could, when transformed into an appropriate domain, be shifted from its expected location. It is this principle that the inventors discovered and from which the numerous advantages and applications discussed above, and in more detail below, arise.

Thus, the periodic pattern may be such that, when the geophysical wavefield is recorded and the recorded geophysical data is transformed into another appropriate domain, at least some of the recorded geophysical data is shifted to a location that is different to the location where the at least some of the geophysical data would have been had the varying signature not been used. The location where the at least some of the geophysical data would have been had the varying signature not been used may be the location where the at least some of the geophysical data would have been had no varying signature been used. When using a seismic wavefield, and when transforming into the frequency-wavenumber domain, this location may be a signal cone centred around k=0.

The method uses a deterministic variation of the signature of the source such that, when the generated geophysical wavefield is recorded and transformed into an appropriate domain, the location of at least part of the recorded geophysical data is shifted in that domain. The signature may be varied in a repeated pattern. The signature may have a deterministic periodic variation.

The periodic variation in signature may be a periodic variation of the signature of subsequent generated wavefields (e.g. from shot to shot). Thus, the signature of each generated wavefield may not vary with respect to itself (i.e. each generated wavefield may only have one signature), but the signature of each wavefield may vary with respect to the signatures of other generated wavefields generated at different locations and/or times.

An appropriate domain is any domain that shows a shift in the location of the geophysical data. For instance, the geophysical data may be recorded in a time-space domain. The other domain may be a frequency-wavenumber domain or a tau-p domain.

The shift may be a shift along the axis in the transformed domain.

The method may comprise recording geophysical energy to produce geophysical data using at least one receiver, the geophysical energy comprising the propagating geophysical wavefield generated at the at least one source; and transforming the geophysical data into another domain. The other domain may be a domain such that at least some of the geophysical data is shifted to a location that is different to the location in the other domain where the at least some of the geophysical data would have been had the varying signature not been used. Here, the at least some of the recorded geophysical data may be all or part of the recorded geophysical data originating from the propagating geophysical wavefield generated by the source.

The receiver may record the geophysical energy in the space-time domain.

The transform may be any transform capable of transforming the data into the appropriate domain. The transform may be a spatial transform. The transform may be a Fourier transform. The transform may be a radon transform. The transform may be a tau-p transform.

When in the appropriate domain, the shift in the data location due to the periodic signature pattern may be a shift in a dimension that is the transform of a spatial dimension. When in the frequency-wavenumber domain, the shift may be by $k_N/n$, e.g. $k_N$, $k_N/2$, $k_N/3$, etc., where $k_N$ is the Nyquist wavenumber.

The at least one receiver may be at a distance from the at least one source.

There may be a plurality of receivers spaced in a generally linear direction.

The at least one source may be moved between different locations between generating subsequent shots. The source may be moved at a constant velocity, and the shots may be fired at constant time intervals, so as to form uniform distance spacing between shot locations. However, it may be that, due to environmental factors for instance (such as winds, sea currents, etc.), the source may not be moved at a constant velocity. In this case, the wavefields may still be generated at constant distance separation by varying the time accordingly between subsequent shots. The source may be moved linearly, so that shot locations form a straight line.

The source may be moved such that a substantially uniform grid of shot locations is formed.

The method may comprise isolating the geophysical data originating from the generated geophysical wavefield from the source from any other geophysical data that may be present in the other domain. This may be done by, for instance, muting the other geophysical data. The other geophysical data may be from other sources, or interference, or noise. The isolated geophysical data originating from the generated geophysical wavefield can then be transformed back into the domain in which it was recoded (e.g. the time-space domain). Thus, a geophysical data set corresponding to the (or each) source may be obtained. This data set can be conditioned (e.g. mathematically) to remove the variation imposed on it by the varying signature. For example, the polarity of appropriate traces can be changed, or the time of different triggers can be changed. This conditioning results in a geophysical data set corresponding to the at least one source that is in a conventional form (i.e. as if it has been generated without any varying source signature) but that has been successfully separated/isolated from other geophysical energy signals that may be present.

The method may comprise recording geophysical energy to produce geophysical data using at least one receiver, the geophysical energy comprising the propagating geophysical wavefield generated at the at least one source; and isolating the geophysical data originating from the propagating geophysical wavefield generated at the at least one source from any other geophysical data that may be present in the other domain.

The isolating step may comprise filtering the recorded data. This filtering may occur in the domain in which the geophysical energy is recorded. This filtering may occur in the domain in the space-time domain or the space-frequency domain. Thus, there may be no need to transform the recorded data into a transformed domain. The filter applied may be a spatial filter, e.g. a space-time filter or a space-frequency filter. The filter may be chosen/created/modelled based on the knowledge that the varying signature will create a shift in the transformed domain. For example, the skilled person may appreciate that if data is going to be shifted in the wavenumber space, then a spatial filter may be applied in spatial space so as to isolate a portion of the data that would be shifted if all the data were transformed into wavenumber space. The filter can be designed such that it has the equivalent data isolation/extraction/rejection properties as the transforming, isolating and re-transforming steps discussed above (i.e. it may isolate the same data as the other isolation method, but without requiring the step of transforming the data).

For instance, it may be possible to design a filter, which may include a transform, that effectively extracts the desired signal (e.g. the signal that would be shifted in the transformed domain). The data in the recorded domain can then be convolved with this filter to output the sought-after data in the recorded domain. The key point is that the filtering of the data in the recorded domain may equally well achieve isolation of the desired data if a suitable filter is used. Such a filter may be designed with an understanding of the theory and with a knowledge of the varying source signature. Thus, the isolation can be achieved by convolving space-time or space-frequency data with a space-time or space-frequency filter. The filter may be designed so that it extracts or rejects portion of the transformed domain space (e.g. the frequency-wavenumber space). Such a filter may not be limited to space-time or space-frequency space; rather it may in any domain in which data is recorded.

This isolated data may also be conditioned.

Conditioning may occur in the domain in which the geophysical data was recorded. Conditioning may occur in the space-time or space-frequency domain.

The periodic pattern may be such that, after transforming the recorded geophysical data into the other domain, a first portion of the recorded geophysical data is shifted to a location that is different to the location in the other domain where the first portion of the geophysical data would have been had the varying signature not been used (i.e. a shifted location), and a second portion of the recorded geophysical data is at a location that is the same as the location in the other domain where the second portion of the geophysical data would have been had the varying signature not been used (i.e. a non-shifted location). Looked at another way, the periodic pattern may be such that, after transforming the recorded geophysical data into another appropriate domain, a first portion of the recorded geophysical data originating from the propagating geophysical wavefield generated by the at least one source would be shifted relative to a second portion of the recorded geophysical data originating from the propagating geophysical wavefield generated by the at least one source. This is different to US 2014/0278119 where all of the data originating from one source is shifted.

The second portion may be the remaining portion of the recorded data, i.e. the recorded data may consist of the first and the second portions. Alternatively, there may be other portions present shifted relative to both the first and the second portions.

Thus, it should be appreciated that the geophysical data originating from the generated geophysical wavefield may be split into two (or more) different portions that are shifted to different locations in the transformed domain. Some of the data originating from the source (the second portion) is found at one location and some of the data originating from the source (the first portion) is found at location shifted relative to the second portion. Thus, it can be appreciated that both the first and the second portions are incomplete relative to the full data signal that would have been received at one location had no varying signature been used. In the present application, the multiplicative effect of these missing portions of the data are referred to as "ghosts" in each portion of the data. These "ghosts" may be considered to be functions which, when multiplied with the full data signal produce the differently shifted portions of the full data signal. Each data portion has an associated "ghost" and the "ghost" associated with each data portion may be different to the ghost(s) associated with the other portion(s), i.e. the "ghost" associated with the first portion (the "first ghost") is generally different to the "ghost" associated with the second portion (the "second ghost"). However, the sum of the all the ghosts should essentially equal 1 (one) as no energy/data is lost or created when partitioning the data into the first and second portions, i.e. substantially no data is lost or created, it is just that some has been shifted relative to the remainder. Thus, looked at another way, the first portion of the data may be equal to the full data multiplied by the first "ghost" (shifted to the first location), and the second portion of the data may be equal to the full data multiplied by the second "ghost". The first ghost plus the second ghost may equal 1 (one), where the full data is split into only two portions.

The inventors have devised a method of reconstructing this partially-shifted data so as to obtain fully-shifted data. The inventors have also devised a method of removing the second portion (e.g. non-shifted portion) of the data. Once these two steps are performed, it should be appreciated that the data will effectively appear to have been fully shifted. These two steps may be performed numerically/mathematically. The details of these steps are set out below.

When the data has undergone a partial shift due to a varying periodic source signature, the shifted data may be clearly seen and identified in the transformed domain (because it is shifted away from the remainder of the data). However, the non-shifted portion of the data originating from the generated wavefield may not be as clearly identified because there may be data from other sources at the non-shifted location. Thus, only the shifted portion can be reliably identified.

However, since the shifted portion is known, the shifted portion can be "deghosted". As mentioned above, the term "ghost" refers to the multiplicative effect of the missing parts of the data in the shifted portion (the missing portion being related to the non-shifted portion). Hence, "deghosting" refers to removing the ghosts by filling in the missing portion of the shifted data portion at the shifted location, i.e. effectively removing the missing portion of the data at the shifted location.

In contrast, since US 2014/0278119 shifts all of the data from one source, there is no partial shift of the data in US 2014/0278119. The present inventors have devised a method that allows all the data from one source to be shifted, even if the source signature variation is only such that only a first portion of the data from the source to be shifted: the second (or remaining) portion is shifted or accounted for by calculating it from the first portion. This method in turn allows for the use of much more primitive signature variations (such as ones that cause only partial shifting of the data, such as time dither, amplitude variations), rather than the much more precise phase variations required by US 2014/0278119. Using more primitive signature variations is advantageous as they are easier to control and allows for the use of simpler cheaper more conventional sources, such as air guns. Essentially, the fact the inventors have devised a method that works for a signature variation that only shifts part of the date from a source leads to a much simpler, more robust and cheaper method of acquiring seismic data, in comparison to US 2014/0278119.

The theory behind the method disclosed in US 2014/0278119 is a well-known shift property of Fourier Transforms. This shift property requires an exact and specific modulation of the source. The present inventors have advanced from US 2014/0278119 in that they have devised a method where there is no need to have such exact and specific modulation functions as prescribed by the shift property. For the first time, the present inventors have devised a new method (based on a new equation that the inventors have derived) that allows for (at least) partial shifting of the data even with less exact and specific modulation of the source signature. Any non-shifted data can be found from the newly-derived theory and then shifted to effectively fully-shift the data, but without requiring the exact and specific source signature modulation. This allows cheaper, simpler, more conventional marine sources (such as air guns) to enjoy the same benefits as the marine vibroseis sources described in US 2014/0278119 (e.g. for simultaneous source acquisition).The present method may comprise the steps of: identifying the first portion; and processing the data to calculate a full data signal at the shifted location of the first portion using the identified first portion. US 2014/0278119 does not include such a step since the data from a given source is necessarily always fully shifted. The "full data signal" here is intended to mean the data that would have been shifted to the shifted location had the signature been varied in such a pattern to achieve this, i.e. that substantially all the data originating from the generated wavefield is effectively shifted to the shifted location of the first portion (by a combination of actually shifting the data and mathematically/numerically shifting the data).

The calculation of the full data signal at the shifted location of the first portion using the identified first portion (i.e. the "deghosting" of the first portion) may be achieved by deconvolution of the first portion. The deconvolution is achieved by knowing the expected shift of the first portion (e.g. the expected shifted portion and the expected non-shifted portion) for a given source signature pattern, which may be derived from theory. The first portion can be deconvolved to find the full data signal at the first shifted location using a function/equation derived from theory. The first portion can be deconvolved with a first ghost, the first ghost having been derived from theory (since first portion is equal to the first ghost multiplied by the full data, if the first portion is known and the first ghost can derived from theory, the full data can be recovered by deconvolution).

Alternatively to deconvolution, it is also possible to calculate the second portion, since the first portion is known (since it has been identified). This can be calculated by knowing the expected data shift for a given source signature pattern. This can be derived from theory. Once the second portion is calculated, it can be added to the first portion in the appropriate first shifted location. This also achieves the desired deghosting.

Deconvolution is preferable since it is achieved in one step and does not require the explicit step of calculating the non-shifted portion of the data. However, both these techniques achieve the same result of "deghosting" the first portion of the data.

Once the first portion has been identified, the method may also comprise processing the data to remove the second portion of the data using the identified first portion.

This may be achieved by effectively calculating the second portion from the first portion. This may be done by calculating the full data signal using the first portion (i.e. "deghosting" the first portion, as discussed above) and then calculating the second portion from the full data (i.e. "reghosting" the full data, using a ghost function corresponding to the second portion). This operation may be thought of as "reghosting" the "deghosted" first portion so that the "reghosted and deghosted" first portion has data that only corresponds to that of the second portion. This may be achieved by convolution of the full data signal at the first shifted location. The convolution is achieved by knowing the expected shift of the first portion relative to the second portion (e.g. the expected shifted portion and the expected non-shifted portion) for a given source signature pattern, which may be derived from theory. The full data (found by deghosting the first portion) can be convolved with a second ghost, the second ghost having been derived from theory (since the second portion is equal to the second ghost multiplied by the full data, if the full data is known and the second ghost can derived from theory, the second portion can be calculated by convolution).

Alternatively to convolution, it is also possible to calculate the second portion, since the shifted portion is known (since it has been identified). This can be calculated by knowing the expected shift for the first portion for a given source signature pattern. This can be derived from theory.

Regardless of whether the calculated second portion is found by "reghosting" the "deghosted" first portion, or by direct calculation from the first portion, once the second portion is calculated it can be subtracted from the recorded data at the location of the second portion (which may be the non-shifted location).

In a particularly preferred embodiment, the numerical/mathematical completion of the full data signal at the first shifted location and the removal of the second portion of the data from the second location may be carried out simultaneously, or in a single step, for example by using a common filter.

The net effect of deghosting and reghosting is that the second portion (the non-shifted portion) of the data may appear to have effectively been shifted to the shifted location. This may be achieved by a data processing technique, as discussed above.

Alternatively the net effect of deghosting and/or reghosting may be achieved by designing an appropriate filter. Using such a filter (as discussed above) may remove the need to transform the data into the other domain.

The periodic varying signature can be modelled as a mathematical function that modulates the generated geophysical wavefield and the recorded geophysical data.

For instance, when the signature is varied using time dither (see below) such that the trigger time of every second generated wavefield from the source is delayed, or advanced, by a time dither T the modulating function may be:

$$g(n) = \frac{1}{2}[1 + e^{i\omega T}] + \frac{1}{2}[1 - e^{i\omega T}](-1)^n \quad (1)$$

where n is trace number. If the modulating function $g(n)$ is applied to conventional (i.e. with no time dither) data $f(n)$, and the Fourier transform of the product is taken, the result is $$\mathcal{F}(f(n)g(n)) = \frac{1}{2}[1 + e^{i\omega T}]F(e^{ik}) + \frac{1}{2}[1 - e^{i\omega T}]F(e^{i(k-\pi)}), \quad (2)$$

where $F(e^{ik}) = \mathcal{F}(f(n))$ and $F(e^{i(k-\pi)}) = \mathcal{F}(f(n)(-1)^n)$. (2)

From equation 2, the $F(e^{ik})$ term is centred around $k=0$ and is the non-shifted portion. The $F(e^{i(k-\pi)})$ term is centred around $k=k_N$ and is the shifted portion. As mentioned above, the shifted portion can be identified and measured from the recorded and transformed data, but it may be difficult to measure the non-shifted portion. However, the missing parts of the shifted data can be filled in (i.e. the "ghosts" in the shifted portion can be "deghosted") using Equation 2 (or any other model for a different source signature pattern) by deconvolution. Using the equation 2 as an example, the full data can be calculated using the first (shifted) portion of the data because $$\text{first portion} = \frac{1}{2}[1 - e^{i\omega T}] * \text{full data}.$$

Alternatively, the non-shifted portion can effectively be calculated using Equation 2 (or any other model for a different source signature pattern) because the shifted portion is known. Once the non-shifted portion has been calculated, it can be added to the shifted portion of the data at the shifted location. These data would effectively look like fully shifted data. Further, the calculated non-shifted portion can be deleted from the recorded data at the non-shifted location to remove the non-shifted portion in the measured data, e.g. by "reghosting" the "deghosted" shifted portion so as to find only the data corresponding to the "ghosts" in the first portion, and subtracting the "reghosted deghosted" shifted data from the non-shifted data. Using the equation 2 as an example, the second (non-shifted) portion can be calculated using the full data (found by "deghosting" the first portion)

$$\text{second portion} = \frac{1}{2}[1 + e^{i\omega T}] * \text{full data}.$$

The shifted portion may be deghosted using mathematical modelling (e.g. using equation 2), where the shifted portion and the total data is known from the transformed data.

After deghosting and/or reghosting, the (fully) shifted data can be isolated and processed as discussed above.

However, it may not be necessary to deghost/reghost the data to produce useful data. For instance, the shifted portion alone can be isolated by muting the remaining data (which includes the non-shifted portion), or the shifted portion alone can be muted leaving the non-shifted portion and any other recorded data from other energy sources. It may be that only the shifted data is isolated or removed. (As discussed below, some of the data may be shifted and some of the data may not be shifted). If, for example, only the shifted data (i.e. non-deghosted shifted data) is removed, then partial residual shot noise attenuation can be achieved.

The signature of the source may be any feature of the source that, when periodically varied (e.g., from shot to shot), may cause the location shift of at least some of the data when transformed into an appropriate domain. For example, the time at which the wavefield is generated by the source can be varied, and/or the polarity of the source and/or the phase of the source and/or the amplitude of the source can be varied. These are four examples of the signature of the source. There may also be other features of the source that can be varied periodically so as to case the data shift. For instance, when the source is an airgun array, the following parameters influence the signature of the source: number of guns, geometry of guns, depth, pressure, timing, water velocity, sea temperature and sea surface conditions. Further, signatures of vibrator sources and vibrator arrays may depend on number of vibrators, geometry, sweep, sequence, timing/delay/advance and polarity.

As mentioned above, the signature may be varied using time dither. Typically a source generates wavefields at regularly spaced times or at regularly spaced locations as the source is moved. It is also known to use random dithers in which the times that subsequent shots are fired are dithered randomly. However, the present method may use a periodic time dither pattern (i.e. when time dither is used to implement the invention, it is periodic). This may be considered to be a discrete time dither approach.

A time dither is where the generated wavefields, which would typically be generated at a certain time, is instead triggered at a slightly delayed, or advanced, time. For instance, without time dither, the generated wavefield may be generated when a moving source reaches a certain spatial location (known, for example, by GPS). When the source reaches the location, the source triggers and a wavefield is generated. A time dither may be where the source does not trigger as soon as the source reaches the given location; instead the source may trigger at a slightly delayed time (or it may be triggered at a slightly advanced time just before the source reaches the given location). Alternatively, the source, without time dither, may generate wavefields at equally spaced times. A time dither in this case may be where the source instead is triggered at a slightly delayed, or advanced, time in comparison to its expected trigger time. The time dither may be considered to be a deterministic delay, or advance, of the source trigger time in comparison to an expected trigger time.

As an example of periodic time dither, every second source shot could be triggered with a constant delay of time T. Of course, other time dither patterns may be used, e.g. every third generated wavefield, fourth generated wavefield, $n^{th}$ generated wavefield could be dithered or different generated wavefields could be dithered by different amounts. Alternatively, the pattern may be two consecutive shots without delay, then two consecutive shots delayed by a constant time shift, the two consecutive shots without time shift, etc. All that is necessary is that the dither pattern is periodic such that it produces a shift in the data when it is transformed into an appropriate domain.

The dither time T may be of any length, but may preferably be up to 10 ms, 20 ms, 30 ms, 40 ms, 50 ms, 100 ms or 200 ms, preferably between 10 ms and 40 ms, between 40 ms and 200 ms, preferably greater than 200 ms.

The time dither T is preferably substantially less than the time taken to move the source between adjacent firing locations. This means that the selected firing location is not greatly moved by the delay time T. The dither time T is preferably substantially less than the time between generated wavefields, which may typically be up to 5 s, 10 s or 20 s.

Preferably, the dither time T is selected so as to avoid being n/2 of the period of the (dominant) frequency of the geophysical wavefield. This is to be avoided, if possible, because when dither time T is n/2 of the period of the (dominant) frequency of the geophysical wavefield, then one of the terms in equation 2 will be zero, which can produce issues during data processing (e.g. dividing by zero causes singularities).

As mentioned above, filters in the recording domain (e.g. space-time) can be designed to predict, extract, or reject components of the data that we are interested in (e.g. from the one or more sources).

As mentioned above, using time dither may lead to only partial shifting of the data in the transformed domain. The origin of this partial shifting is now explained further.

Taking the case where every second trace has a time dither T compared to neighbouring traces, the modulating function that describes how the time dither alters conventional (i.e. non-dithered) data f(n) is:

$$g(n) = \frac{1}{2}(-1)^n + \frac{1}{2} - \frac{1}{2}(-1)^n e^{i\omega T} + \frac{1}{2}e^{i\omega T}. \quad (3)$$

Equation (3) can be written more compactly as, the sum of two modulating functions (one of which is a constant with respect to n). This is the same as equation 1:

$$g(n) = \frac{1}{2}[1 + e^{i\omega T}] + \frac{1}{2}[1 - e^{i\omega T}](-1)^n. \quad (4)$$

Finally, we apply the modulating function g(n) to the conventional data f(n) and take the Fourier transform and obtain the result:

$$\mathcal{F}(f(n)g_2(n)) = \frac{1}{2}[1 + e^{i\omega T}]F(e^{ik}) + \frac{1}{2}[1 - e^{i\omega T}]F(e^{i(k-\pi)}). \quad (5)$$

Equation 5 shows that the geophysical data will be mapped in two places. Part of the data will remain at the signal cone centred around k=0 and another part of the data will be mapped to a signal cone centred around the Nyquist wavenumber $k_N$.

As explained above, by only knowing one of these parts of the data we can predict the other using equation 5 to "deghost" or "reghost" the data. Of course, any other equivalent equation for another time dither pattern can be used for this step.

When time dither is used, the remainder of the signature of the generated wavefields may be identical.

Whilst the time dither method has been explained in terms of a delayed time shift, it should be understood that this is exactly equivalent to generating wavefields early by the same time shift (depending on which wavefields you consider as being the un-shifted wavefields).

Time dither may be the preferred signature variation because it can be performed using conventional sources (e.g. an airgun), i.e. there is no need for any special or adapted source.

Additionally or alternatively, the signature may be varied by varying the polarity of the generated geophysical wavefield. The polarity may be varied from geophysical wavefield to geophysical wavefield such that polarities alternate in sequence. This is particularly useful when using the present method in modelling geophysical wave propagation, full waveform inversion, or reverse time migration.

As an illustrative example, the alternating sequence may be such that every second generated wavefield has opposite polarity (e.g. +1, −1, +1, −1 etc.).

In this case, a recorded common receiver gather will have every second trace with flipped polarity. This may be represented as the following modulating function having been applied to a conventional data set f(n) where all traces had the same source signature:

$$g(n)=(-1)^n. \quad (6)$$

Equation 6 can also be written as $$g(n)=e^{i\pi n}. \quad (7)$$

By applying the function g(n) in equation 7 as a modulating function to data f(n) before taking a (normalized) discrete Fourier transform:

$$\mathcal{F}_{(f(n))}=F(e^{ik}),$$

we obtain $$\mathcal{F}_{(f(n)g_1(n))} = \mathcal{F}_{(f(n)e^{i\pi n})}=F(e^{i(k-\pi)}), \quad (8)$$

Equation 8 shows that modulating a function with equation 6 results in a wavenumber shift by the Nyquist wavenumber $k_N$.

Thus, it can be appreciated that when alternating polarity flips are used, the recorded data, once transformed into an appropriate domain, will be shifted away from the location where the data would have been had no varying signature been used.

As another example, a second generated geophysical wavefield may have the same polarity as a first generated geophysical wavefield, a third generated geophysical wavefield may have opposite polarity to the second generated geophysical wavefield, a fourth generated geophysical wavefield may have the same polarity as the third generated geophysical wavefield, a fifth generated geophysical wavefield may have opposite polarity to the fourth generated geophysical wavefield, a sixth generated geophysical wavefield may have the same polarity as the fifth generated geophysical wavefield, (i.e.+1, +1, −1, −1, +1, +1, −1, −1). This may be considered as alternating polarity of pairs of geophysical wavefields. Such a sequence leads to shift in the data of $\pm k_N/2$.

Any other sequence can be used. All that is necessary is that the polarity pattern is periodic and produces a shift in the data when it is transformed into an appropriate domain.

When the polarity is varied, the remainder of the signature of the generated wavefields may be substantially identical.

Polarity variation and time dither may both be used together. The remainder of the signature may be substantially identical.

Varying the polarity of the source may be achieved in a number of ways.

More generally, in comparison with the specific time dither example of equations 3-5 and the specific polarity example of equations 6-8, the following general mathematical description is applicable for a periodically-varying source signature. The following mathematical description is applicable when a source is excited with the same signature at all even source location numbers and when, at all odd source location numbers, the source signatures are also identical to each other but differ from the source signature at the even source location numbers such that the source signature at the odd source location numbers is a scaled or filtered version of the source signature at even source location numbers. Let this convolution filter be denoted by a(t), with frequency-domain transform A(ω). Analysed in the frequency domain, a receiver gather (e.g. one receiver station measuring the response from a sequence of sources) recorded in this way, can be constructed from the following modulating function g(n) applied to a conventionally sampled data set:

$$g(n) = \frac{1}{2}(1 + (-1)^n) + \frac{1}{2}A(\omega)(1 - (-1)^n) \quad (9)$$

which can also be written as $$g(n) = \frac{1}{2}(1 + e^{i\pi n}) + \frac{1}{2}A(\omega)(1 - e^{i\pi n}) \quad (10)$$

Equation 10 is a more general formulation of equation 1 and equation 6. In equation 1 (e.g. for period time dither, T), A(ω)=$e^{i\omega T}$. In equation 6 (e.g. for periodic polarity changes), A(ω)=−1. Other possible signature variations are also possible and can be represented as A(ω)=1, A(ω)=0, A(ω)=1+$e^{i\omega T}$.

By applying (e.g. record by record temporal convolution) the function g(n) in equation 9 as a modulating function to data f(n) before taking a (normalized) discrete Fourier transform in space (N uniformly space source points over n):

$$F(k) = \frac{1}{N}\sum_{n=0}^{N-1}f(n)e^{-i2\pi kn/N}$$

we obtain $$H(k) = \frac{1}{N}\sum_{n=0}^{N-1} f(n)g(n)e^{-i2\pi kn/N} \quad (11)$$

$$= \frac{1+A(\omega)}{2}F(k) + \frac{1-A(\omega)}{2}F(k-k_N)$$

which follows from a standard Fourier transform result.

Equation 11 shows that the recorded data f will be mapped into two places in the spectral domain as illustrated in FIG. 2. Part of the data will remain at the signal cone centred around k=0 and part of the data will be mapped to a signal cone centred around k=$k_N$.

The amount of data that is shifted from k=0 to k=$k_N$ and the amount of data that remains at k=0, depends on the function A($\omega$).

The fraction of the data that is shifted from k=0 to k=$k_N$ is given by $$H_- = \frac{1-A(\omega)}{2}.$$

The fraction of the data that remains at k=0 is given by $$H_+ = \frac{1+A(\omega)}{2}.$$

When A($\omega$)=1. $H_-$=0 and $H_+$=1. Thus, all the data remains at k=0.

When A($\omega$)=−1. $H_-$=1 and $H_+$=0. Thus, all the data is shifted to k=$k_N$.

When A($\omega$)=0. $H_-$=½ and $H_+$=½. Thus, half the data is shifted to k=$k_N$ and half of the data remains at k=0.

When A($\omega$)=½. $H_+$=¼ and $H_+$=¾. Thus, one quarter of the data is shifted to k=$k_N$ and three quarters of the data remains at k=0.

When A($\omega$)=$e^{i\omega T}$. $H_-$=(1−$e^{i\omega T}$)/2 and $H_+$=(1+$e^{i\omega T}$)/2. Thus, a frequency-dependent portion of the data is shifted to k=$k_N$ and the remaining portion remains at k=0. For instance, when $$\omega = \frac{2\pi n}{T},$$

$H_-$=0 and $H_-$=1, so none of the data with a frequency of $$\omega = \frac{2\pi n}{T}$$

is shifted to k=$k_N$ and it all remains at k=0; and when $\omega$=π(2n+1)/T, $H_-$=1 and $H_-$=0, so all of the data with a frequency of $\omega$=π(2n+1)/T is shifted to k=$k_N$ and none remains at k=0.

When A($\omega$)=1+$e^{i\omega T}$. $H_-$=−$e^{i\omega T}$/2 and $H_+$=1+$e^{i\omega T}$/2. Thus, a frequency-dependent portion of the data is shifted to k=$k_N$ and the remaining portion remains at k=0.

Importantly, and as has been discussed in detail above, by knowing or observing one of the portions of the data (e.g. the shifted portion, or the none-shifted portion), it is possible to predict the other portion of the data. In the present method, it is therefore not necessary to fully shift the data, which means simpler, more primitive source signature variations (such as time dither or amplitude changes) can be used. In turn, this allows the present invention to be performed using simple sources, such as air guns. This is different to US 2014/278119 where it is necessary to use a very strict phase variation in order to fully-shift the data from a source. The strict phase variation can only be performed using marine vibrator sources.

Returning to the present method, a marine vibroseis source may be used. The marine vibroseis source enables a high degree of control of the source signature and emitting a signal with opposite polarity is fairly straightforward. However, they are expensive and time-consuming to use. It may therefore be preferable to use a simpler source, which (in contrast to US 2014/0278119) the present method allows the use of.

A water gun may be used. A water gun source has a main peak that has negative polarity instead of positive polarity and could therefore be used in combination with an airgun source (which has a main peak that is positive) to acquire the desired data.

Air gun sources may be used. The air gun sources may be located relative to each other such that they effectively produce signatures that are substantially opposite in polarity.

It should be noted that, in modelling, reverse time migration, inversion or imaging applications, it is not necessary to have any particular apparatus that can achieve the desired source signature variation. Rather, the source can simply be chosen and modelled synthetically, so it is irrelevant how the signature could be varied in the "real life" scenario.

The method may comprise varying the signature of the at least one source such that, once geophysical energy comprising the generated geophysical wavefield and another signal is recorded and the recorded geophysical data is transformed into another appropriate domain, the recorded geophysical data originating from the generated geophysical wavefield will be shifted away from recorded geophysical data originating from the other signal. The other signal may be noise, interference, or one or more other sources.

At least two sources may be used to simultaneously generate geophysical wavefields. The first source may have a varying signature. The second source may have no varying signature, or may have a different varying signature. Thus, once the geophysical energy is recorded and transformed into another appropriate domain, the geophysical data from the first source will be shifted away from the geophysical data of the second source.

There may be any other number of sources, each with a different signature such that all data from all sources are separated from one another after an appropriate transform.

In the prior art, attempts have been made to record seismic data using multiple simultaneous sources by using random time dithers or encoding sources using orthogonal sequences.

The present method provides an improved method for using two (or more) simultaneous sources because the recorded data from each source can be shifted in the transformed domain, and so the data from each source can be separated, and therefore identified and isolated, from the recorded data from the other source(s).

This is a particularly important use of the present invention, as using multiple sources can decrease the amount of computation required during modelling (modelling can be very computationally heavy, so this is an important consideration). For instance if two sources are used simultaneously in modelling, computation required to obtain the same amount of data can be a half, and if three sources are used simultaneously, computation can be reduced to a third. Theoretically, if n sources are used simultaneously, the computation required to obtain the same amount of data in comparison to a single source is 1/n.

Similarly, using multiple sources can increase the rate at which geophysical data is acquired during acquisition. For instance, if two sources are used simultaneously, data can be acquired at approximately twice the rate in comparison to a single source, and if three sources are used simultaneously data can be acquired at approximately three times the rate. Theoretically, if n sources are used simultaneously, data can be acquired n times faster.

Thus, when multiple simultaneous sources are used, the present method can allow the data from at least one of the sources to be identified in the data recorded by the receiver. This can be useful in many different techniques. For instance, when using a source array (which typically comprises a plurality of smaller source elements spread over an area), it can be desirable to interpolate data to positions between locations at which shots are fired. Knowing which recorded wavefield came from which source can greatly ease this calculation.

Further, using multiple sources can allow for a wider range of frequencies to be used. For instance, a low frequency source and a high frequency source could be used simultaneously, and/or airgun source(s) and vibrator(s) could be used simultaneously. Without the present method, at intermediate overlapping frequencies, the recorded data from these two sources would interfere. However, the present method can be used to separate the recorded data from such sources. Thus, the method may be used for broad band seismic acquisition or modelling. In broadband acquisition or modelling, one or more low-frequency generating source(s) (such as the seismic equivalent of a "subwoofer") may be used simultaneously with a conventional higher frequency source.

Further, using multiple sources, whose data can be separated and identified using the present method, can have benefits when performing reverse time migration and full waveform inversion.

The at least two sources generate their respective geophysical wavefields simultaneously. Simultaneous means that the at least two sources produce geophysical wavefields over the same time period. It does not necessarily mean that the at least two sources are triggered such that they produce wavefields at exactly the same time. For instance, when dither is used, the wavefields may intentionally be generated at different times. Of course, when polarity changes are used, the multiple sources may (or may not) produce wavefields at exactly the same time.

The method may comprise selecting the varying signature such that, once the recorded geophysical data is recorded and transformed into another domain, the portion of the recorded geophysical data originating from the generated wavefield will be at least partially shifted away from an interference portion of the recorded seismic data.

The generated propagating geophysical wavefield may be affected by interfering geophysical energy (e.g. from other geophysical wavefields, possibly produced by another nearby geophysical survey, or background noise). When this occurs the recorded geophysical data may comprise a signal portion from the generated geophysical wavefield and an interference portion from the interfering geophysical data. In order to remove the interference portion, the signature pattern should be varied such that the at least some of the signal portion will be at least partially shifted away from the interference signal in the transformed domain.

Conventional geophysical interference reduction techniques are not effective when the geophysical interference is propagating from the broadside of the line of the receivers. The present method can handle these interferences well.

The operator may choose the pattern on the basis of prior knowledge or estimations of the geophysical interference. In the case where the interference is from a neighbouring survey, the operator may choose the pattern on the basis of the known signal coming from the neighbouring survey so as to shift the signal portion from the interfering portion.

The pattern may be chosen so that the signal portion is shifted as far from the interference portion as possible.

The method may further comprise removing the interference portion. The interference portion may have a dominant frequency, and the method may comprise using a time dither of approximately the same as, a half of or a quarter of the period of the dominant frequency. This time dither may be on every second generated wavefield.

The method may comprise selecting the varying signature such that, once the geophysical data is recorded and transformed into another domain, a residual shot noise portion of the recorded geophysical data will be at least partially shifted away from the portion of the geophysical data originating from the generated geophysical wavefield.

The generated propagating geophysical wavefield may be affected by residual shot noise. When this occurs, the recorded geophysical data may comprise a signal portion from the generated geophysical wavefield and a residual shot noise portion from the residual shot noise.

Residual shot noise occurs in geophysical traces due to each trace covering a finite time period. A trace typically starts when the geophysical wavefield is produced and will end when (or before) the next geophysical wavefield is produced. However, when the next trace is recorded, there may be some residual shot noise (e.g. from deep reflections) from previous geophysical wavefields that are recorded. Whilst this is undesirable, it is difficult to avoid. One prior art method of avoiding residual shot noise is to lengthen the time of each trace. However, this in turn increases the time between subsequent generated wavefields, which is inefficient.

In some applications, the "residual shot noise" may actually be part of the useful/wanted signal. Such an application is discussed below, where effectively the rate at which shots and traces are triggered is increased such that the time between generating subsequent shots may be less than the time taken for the geophysical wavefield energy signal associated with each generated geophysical wavefield to be completely recorded by the receiver.

Using the present method, the residual shot noise can be shifted away from the desired signal from the source in the appropriate domain such that the residual shot noise can be identified. The residual shot noise may be removed/muted, or separated and used as geophysical data.

Thus, using the present method, there is less of a need to wait for residual shot noise to die down before taking a subsequent trace. Thus, the time interval between subsequent generated geophysical wavefields (and hence traces) can be reduced, which can increase the density of the data (e.g. spacing between locations where geophysical wavefields are generated by the at least one source), or can increase the speed at which the data is taken (e.g. increase the tow speed of the source). This increases the efficiency of geophysical data gathering.

The residual shot noise portion may have a dominant frequency.

The method may comprise using a time dither of approximately the same as, a half of or a quarter of the period of the dominant frequency of the residual shot noise. This time dither may be on every second generated wavefield.

As mentioned above, the periodic pattern of the varying polarity of sequentially generated geophysical wavefields may be: a second generated geophysical wavefield having the same polarity as a first generated geophysical wavefield, a third generated geophysical wavefield having opposite polarity to the second generated geophysical wavefield, a fourth generated geophysical wavefield having the same polarity as the third generated geophysical wavefield, a fifth generated geophysical wavefield having opposite polarity to the fourth generated geophysical wavefield, a sixth generated geophysical wavefield having the same polarity as the fifth generated geophysical wavefield, (i.e. +1, +1, −1, −1, +1, +1, −1, −1), etc.

This pattern may be particularly advantageous for identifying (and hence removing) residual shot noise. In a trace, the largest residual shot noise typically comes from the generated wavefield of the previous trace. This is therefore the most important residual shot noise to deal with. Using the above pattern allows for this residual shot noise to be identified as follows:

Say the first generated wave has polarity +1, the second has polarity +1, the third has polarity −1 and the fourth has polarity −1 (etc.). The main signal in the first trace will have polarity +1, the main signal in the second trace will have polarity +1, the main signal in the third trace will have polarity −1, and the main signal in the fourth trace will have polarity −1. However, the largest component of residual shot noise in a given trace (i.e. that from the previous shot) will have the same polarity as the main signal in the previous trace. So the largest component of residual shot noise in the first trace will have polarity −1 (same polarity as main component of preceding trace) the largest component of residual shot noise in the second trace will have polarity +1 (same polarity as main component of first trace), the largest component of residual shot noise in the third trace will have polarity +1 (same polarity as main component of second trace) and the largest component of residual shot noise in the fourth trace will have polarity −1 (same polarity as main component of third trace).

We therefore have a set of traces, $t_n$(main signal polarity, residual shot noise polarity), as follows: $t_1$(+1, −1), $t_2$(+1, +1), $t_3$(−1, +1), $t_4$(−1, −1), etc.

The method may comprise, prior to transforming the data, multiplying all traces having "+1" polarity as their main signal (i.e. the traces that are generated by a source with +1 polarity with, in this case $t_1$ and $t_2$) by −1. This leaves the set of traces with polarity as follows: $t_1$(−1, +1), $t_2$(−1, −1), $t_3$(−1, +1), $t_4$(−1, −1), etc.

Alternatively (and completely equivalently, given the terms +1 and −1 are merely depicting opposite polarities), the method may comprise, prior to transforming the data, multiplying all traces having "−1" polarity as their main signal (i.e. the traces that are generated by a source with −1 polarity with, in this case $t_3$ and $t_4$) by −1. This leaves the set of traces with polarity as follows: $t_1$(+1, −1), $t_2$(+1, +1), $t_3$(+1, −1), $t_4$(+1, +1), etc.

Regardless of which of these methods is carried out (they are essentially equivalent), the result is that all the main signals in the set of traces have the same polarity and the residual shot noise has alternating polarity. Thus, equation 6 above applies to the residual shot noise component only, and not the main signal component.

Thus, when an appropriate transform of the set of traces is taken, the residual shot noise may be shifted relative to the main signal. In the specific case given here, the shift is the Nyquist frequency $k_N$.

In this application of the present method, it is preferable to have the at least one source generate the wavefields at regular, constant time intervals, e.g. rather than at regular spacing intervals. (Of course, if time dither is used, then the regular time intervals may not be totally constant, but the average time between shots will be constant, and the "expected" shot trigger time (from which time dither is measured) will be constant.)

The method may comprise selecting the varying signature such that, once the geophysical data is recorded and transformed into another domain, a pressure wave portion of the geophysical data will be at least partially shifted away from a shear wave portion of the geophysical data.

After reflection from a subsurface structure, the propagating geophysical wavefield may comprise reflected pressure waves and reflected shear waves such that the recorded geophysical data comprises a pressure wave portion and a shear wave portion. However, the shear waves travel more slowly than pressure waves.

A trace typically starts when the geophysical wavefield is produced and will end when (or before) the next geophysical wavefield is produced. It is desirable to record both the shear and the pressure waves. Before the present method, if it were desired to record both the shear wave and the pressure wave, it would be necessary to do so in the same trace. This, however, when viewed from the pressure wave alone is not efficient because of the delay in the shear wave arrival. Thus, similar to the residual shot noise discussed above, one prior art method is simply to have increased of trace times, and increased intervals between generated geophysical wavefields. This is inefficient.

Using the present method, the pressure wave and the shear wave may arrive in different traces. Due to the varying periodic signature of the source, it will be possible to separate the pressure and shear arrivals in the transformed domain. Further, due to the varying periodic signature of the source it will be possible to know from which generated geophysical wavefield the shear wave originated, regardless of which trace it is recorded in.

The separated shear and pressure waves may both be used as geophysical data for analysing the subsea structure. Alternatively, the shear or pressure wave may be removed/muted.

Thus, using the present method, there is less of a need to wait for shear waves to arrive before taking a subsequent trace. Thus, the time interval between subsequent generated geophysical wavefields (and hence traces) can be reduced, which can increase the density of the data (e.g. spacing between locations where geophysical wavefields are generated by the at least one source), or can increase the speed at which the data is taken (e.g. increase the tow speed of the source). This increases the efficiency of geophysical data gathering. Additionally, in the case of pressure and shear data acquisition signal-to-noise can also be increased due to the fact that shear data tend to be mostly arriving on the horizontal component in seabed recordings and pressure waves mostly arrive on the vertical component. Thus, after separation of the horizontal and vertical components, the pressure data and the shear data may be substantially separated.

The method may comprise generating subsequent geophysical wavefields at a rate that is faster than is conventionally possible. The time between generating subsequent geophysical wavefields may be less than the time taken for the geophysical wavefield energy signal associated with each generated geophysical wavefield to be completely recorded by the receiver.

In conventional systems, traces are typically triggered with each shot. Each trace therefore records the wavefield signal generated from each shot. The wavefield signal takes a certain amount of time to completely be recorded by the receiver (by "completely" recorded here, we are not referring to residual noise, we are referring to only the wanted/useful signal from the generated wavefield).

However, as mentioned in relation to the residual shot noise application, the traces must be of a certain length so as to record all of the wanted/useful propagating wavefield signal from the respective shot, and to avoid too much interference/noise from previous shots. Since the trace and the shot are triggered together, the minimum trace length leads to a minimum time between shots, and so limits the rate at which data can be acquired.

However, in the present invention, it is possible to fire shots and to record traces at a greater rate. If the signature of the source is varied in a suitable periodic pattern, any given trace can record the signal (i.e. the wanted/useful data signal) portion from more than one source, since the data recorded from each source in each trace can later be identified/isolated using the present method. This allows data acquisition to be much faster.

Once the data in a given trace originating from a source shot previously to the trigger time of the given trace has been identified/isolated, this data can be added to the data recorded for the previous shot (i.e. this data can be concatenated with the previous data since this portion of the data has a zero time that corresponds to the trigger of the given shot). The previous shot may preferably be the shot for the trace immediately preceding the given trace.

For instance, take the case where the signal from a generated wavefield takes time $t_0$ to fully pass the receiver. Using conventional techniques, the system would be limited to a shot trigger and trace trigger time interval of $t_0$. However, using the present method it is possible to simultaneously record the signal portion from two subsequent shots in the same trace, and then separate the recorded data from each shot. In this case, shots and traces can be triggered at intervals of $$\frac{t_0}{2}.$$

Further, in the case where it is possible to simultaneously record (in the same trace) and then separate the recorded data for n subsequent shots, shots and traces can be triggered at intervals of $$\frac{t_0}{n}.$$

The geophysical wavefield, energy and/or data may be a seismic wavefield, energy and/or data. The geophysical wavefield, energy and/or data may be a controlled source electromagnetic wavefield, energy and/or data.

It should be recognised that this application uses the same principals to those of the residual shot noise application, but that what was considered as "noise" now is "useful" signal that needs to be moved to its right place (i.e. following the end of the previously recorded shot). In other words we deliberately let more of the desired signal end up as "residual shot noise" in the next shot(s) where it can be isolated, removed from the next shot(s) and added to the appropriate previous shot(s).

The transform may be a Fourier, tau-p or radon transform. The appropriate domain may be a frequency-wavenumber domain, or a tau-p domain.

As discussed above, the method may be used to improve the estimation of source-side gradients. When conducting data acquisition the source may be in the form of an array of sub-arrays of sources. The sub-arrays may be separated vertically and/or horizontally.

Using the present method, data from two or more sources (or sub-arrays of sources) in the array can be found. By knowing the data from each source (or sub-array), the calculation of the source-side (horizontal and/or vertical) gradient is greatly eased.

The method may comprise calculating the (horizontal and/or vertical) gradient of the source between two or more sources, or two or more sub-arrays.

Similarly, since the data from a specific source can be identified in the recorded data using the present method, the calculation for source-side deghosting of the data is greatly eased, particularly when data is acquired from multiple sources simultaneously.

The method may comprise source-side deghosting the recorded geophysical data.

The separated data produced by the present method may be used to reconstruct or interpolate the geophysical data on the source-side.

The at least one source may be an airgun source, an airgun source array, a marine vibroseis source, a watergun source, a flip/flop source, or an electric and/or magnetic source. An electric and/or magnetic source may be an electromagnetic source, i.e. a source for producing electromagnetic data. Alternatively or additionally, a flip/flop/flap source (which may comprise three source arrays) or a penta-source (which may comprise five source arrays) may be used. A flip/flop source, a flip/flop/flap source and a penta-source are examples of multi-arrays that can be used as the source of for the present method. Such multi-arrays may be towed behind a single vessel.

When a flip/flop source is used with time dither between the flip and flop shots (e.g. either all the flip shots or all the flop shots are dithered by a constant time), the two flip and flop sources may be staggered in the inline direction to compensate for differences in shooting times. The flip/flop sources may be being moved during shot firing at a constant velocity. The stagger may be such that the flip and flop shots are spaced equally in space, but are dithered in time. For instance, if the flop shot time dither is 0.2 s and the speed of the source is 2.5 m/s, the flop shot may be 0.5 m in front of the flop shot. The flip/flop source may comprise airgun sources. In this case, the flip/flop source could be considered to be one source, and should not be confused with the case of using multiple simultaneous sources. (However, a flip/flop source could also be used as two simultaneous sources, if they are staggered appropriately in the in line direction.)

Staggering such as this may also be used for any type of source (i.e. not just flip-flop sources) when multiple sources are present.

Such a staggering of sources may be particularly important for any application where the source is triggered at regular, constant time intervals, e.g. rather than at regular spacing intervals. (Of course, if time dither is used, then the regular time intervals may not be totally constant, but the average time between shots will be constant, and the "expected" shot trigger time (from which time dither is measured) will be constant.) This may be particularly relevant for the residual shot noise application discussed above. Staggering the sources in such a manner when using constant time triggering allows for the shot locations to have constant spatial separation.

The recorded geophysical data may be gathered/sorted in the common receiver domain. The recorded geophysical data may be gathered/sorted in the common midpoint planes domain. The recorded geophysical data may be gathered/sorted in the common offset domain. The transform may be carried out on data in either of these domains.

The geophysical data may be 2D data or 3D data.

For 2D data, the recorded data (which may be in the space-time domain) may be recorded in one space dimension (e.g. inline or crossline) and one time dimension. Thus, only one spatial coordinate may be required for 2D data. When transforming into the other domain, the other domain may also be a two dimensional domain. For instance, when transforming into the frequency-wavenumber domain, there may only be one wavenumber dimension and one frequency dimension. When using a filter, the filter may be a 2D filter, and may filter in only one spatial dimension.

For 3D data, the recorded data (which may be in the space-time domain) may be recorded in two space dimension (e.g. inline and crossline) and one time dimension. Thus, two spatial coordinates may be required for 2D data. When transforming into the other domain, the other domain may also be a three dimensional domain. For instance, when transforming into the frequency-wavenumber domain, there may be two wavenumber dimensions (e.g. $k_x$ and $k_y$) and one frequency dimension (e.g. an (f, $k_x$, $k_y$) space). When using 3D data, the shifting can be performed in more than one dimension (e.g. $k_x$ and/or $k_y$). This allows for more signature options, more shifting options and more space into which to shift the recorded data. When using a filter, the filter may be a 3D filter, and may filter in only two spatial dimensions.

The geophysical data may be marine seismic data, seabed seismic data, permanent reservoir monitoring data, land seismic data, VSP data, controlled source electromagnetic data, electric data and/or magnetic data.

When signals from multiple simultaneous sources are separated by transforming into an appropriate domain, it is preferable that the signal band is as narrow as possible in that domain. This is so that overlap of the signal bands from the different sources is avoid or minimised. For instance, data from each source can be in the form of a signal cone. The data from the different sources may be aliased if the signal cones overlap. When the signals overlap, it can be difficult to separate the signals from the different sources. It is therefore an important consideration to make the widths of the data signals in the transformed domain as narrow as possible. The inventors have found several ways of doing this, and these are discussed below.

Thus, the method may comprise reducing the width of the data signal originating from the at least one source in the other domain. The method may comprise reducing the interference of the recorded data originating from multiple sources. This may be achieved by applying data processing and de-aliasing techniques to the data in the first domain, as is discussed below or any general data processing technique for this purpose, for instance as those described in Yilmaz (2001). By signal width we mean, for instance, the spatial aperture of the signal cone in fk.

The method may comprise reducing the highest apparent wavenumbers. This may be done for the data for one or more of the sources. This may be done prior to transforming, and may be done mathematically (e.g. using signal processing), or may be done physically (e.g. by altering the source-receiver set up). Details on these techniques are given below.

The method may comprise gathering the data in, or sorting the gather data into, a domain that minimises the signal width in the transformed domain. Such a domain may be the common receiver domain, common source domain, common midpoint domain or common offset domain. The common offset domain may be preferred because it comprises larger apparent velocities of arrivals than the common receiver domain, and so the signal cone will be larger in the frequency-wavenumber domain.

The method may comprise removing low-speed waves of the recorded wavefield, for instance the direct wave arrival, the guided water layer wave arrival and/or the bottom refraction wave arrival. These slow speed waves are the limiting factor for the signal cone in the frequency-wavenumber domain, and removing them reduces the width of the signal cone. These arrivals may be removed by modeling these arrivals, and subtracting them from the recorded data.

The method may comprise having the source and the receiver far apart (such as at least 100 m, 200 m, 500 m, 1000 m, or 10000 m). If data are recorded far from the source, due to the reduced azimuth range between source and receiver, the width of the signal cone will be narrower.

Any of these methods may be performed in combination with each other.

Due to the cone-shape of the signal in the transformed domain, the lower frequency data will typically not overlap with low frequency data from other sources. This lower frequency data may be considered as unaliased data. The threshold frequency up to which there is no data overlap and above which there is overlap will depend on the width of the signal cones and the separation of the signal cones. The higher frequency data above the threshold may be considered to be aliased data.

In order to produce non-aliased data from each source, the inventors have found the following techniques.

The method may comprise reconstructing unaliased data for one or more sources based on the unaliased lower frequency data. There are known techniques for achieving this. This method may be performed in combination with any of the wavenumber-limiting techniques discussed above.

In broadband modeling/acquisition, the lower frequency unaliased data may predominantly be from the low frequency source(s). Thus, broadband modeling/acquisition data may be particularly easily separated using the present method.

When using multiple simultaneous sources, all of the sources may be of a low enough frequency such that they do not interfere. Preferably however there may also be one higher frequency source. Because there is only one higher frequency source, its high frequencies will not interfere with any other signals (and its low frequency signals will not interfere with the other low frequency sources because of the cone-shape of the data).

Thus, the frequencies of the multiple sources may be selected to minimise interference/aliasing of the data from each source.

It should be appreciated that the method steps discussed above can apply equally to modelling and to physical data acquisition.

The method may comprise applying source motion corrections to the recorded data. This may be performed using any known technique.

The method may comprise regularising the data. This may occur after transforming the isolated data back into the original domain (e.g. the time-space domain), after filtering or after conditioning. The data may need to be regularised if the spatial locations at which the wavefields were generated by the source are not the desired locations. This may be the case if the wavefields were triggered with respect to constant time intervals rather than with respect to constant spacing intervals, or if a large time dither was used. The regularising may be spatially regularising. Regularising the data can be achieved using standard regularising techniques. Regularising can occur in the domain in which the data was recorded or in the transformed domain.

It should be noted that all "shifts" in the data discussed above are merely relative shifts in the transformed domain, i.e. when it is stated that a first data set is shifted away from a second, it could equally be thought of as shifting the second data set away from the first, or indeed both data sets being shifted relative to another point. The data in the domain may be periodic, e.g. in the frequency-wavenumber domain the data may have a period of $2k_N$ (i.e. data at k and $k+2nk_N$ may be identical). Thus, it should be understood that the axes may be altered by effectively shifting all the data. Which data set(s) is/are being "shifted" will simply depend on whether the axes in the domain are also shifted, which can be freely chosen by the operator.

Further, it should be noted that the "shifted location" is not one specific location/coordinate in the domain, but rather refers to a shift by the same amount in the domain (e.g. data that would have had a coordinate $k_1$ when shifted to the "shifted location" has location $k_1+k_{shift}$ and data that would have had a coordinate $k_2$ when shifted to the "shifted location" has location $k_2+k_{shift}$).

In a second aspect, the invention provides a system for generating geophysical data comprising at least one source for generating a geophysical wavefield with a varying signature, wherein the source is configured to vary the signature of the geophysical wavefield in a periodic pattern.

The system may further comprise: at least one receiver for recording geophysical energy, the geophysical energy comprising the propagating geophysical wavefield generated at the at least one source; and a processor for transforming the recorded geophysical data into another domain. The other domain may be a domain such that at least some of the recorded geophysical data is shifted to a location that is different to the location in the other domain where the at least some of the geophysical data would have been had the varying signature not been used. Here, the at least some of the recorded geophysical data may be all or part of the geophysical data originating from the propagating geophysical wavefield generated by the source.

The system may comprise at least one receiver for recording geophysical energy, the geophysical energy comprising the propagating geophysical wavefield generated at the at least one source; and a processor for isolating the geophysical data originating from the propagating geophysical wavefield generated at the at least one source from any other geophysical data that may be present in the other domain. The processor comprises a filter for filtering the recorded data. The filter may be the filter discussed above in relation to the method.

The system may further comprise at least two sources each for generating a geophysical wavefield, the first source having no varying signature and the second source having the varying signature, such that the geophysical data from the second source will be shifted away from the geophysical data of the first source. Alternatively, each source could have a different varying signature, such that the geophysical data from the second source will be shifted away from the geophysical data of the first source.

The system may be configured to perform any of the above-discussed methods. The system may comprise any of the features discussed in relation to the above-discussed methods.

In a third aspect, the invention provides a computer program product comprising computer readable instructions that, when run on a computer, is configured to: cause at least one source to generate a geophysical wavefield with a varying signature, wherein the signature is varied in a periodic pattern.

The computer program product may be configured to perform any of the methods of the first and/or second aspects. The computer program product may be configured to cause any of the systems of the first and/or second aspects to perform any of the above discussed methods.

In a fourth aspect, the invention provides a method of prospecting for hydrocarbons. This method comprises performing any of the methods of the first and/or second aspects, possibly using the computer program product of the third or seventh aspects. This method may comprise using the system of the second aspect and/or the computer program product of the third aspect to prospect for hydrocarbons.

The method may comprise using the generated geophysical data to identify locations for drilling and/or identifying well locations using the model. The method may comprise drilling at and/or into said identified locations.

In a fifth aspect, the invention the invention provides a method of producing hydrocarbons. The method may comprise performing any of the methods of the first and/or fourth aspects, and producing hydrocarbons through the drilled wells. This method may comprise using the system of the second aspect and/or the computer program product of the third aspect to produce hydrocarbons.

BRIEF DESCRIPTION OF THE DRAWINGS

Preferred embodiments of the invention will now be discussed, by way of example only, with reference to the accompanying drawings, in which.

DETAILED DESCRIPTION

Figure 1:
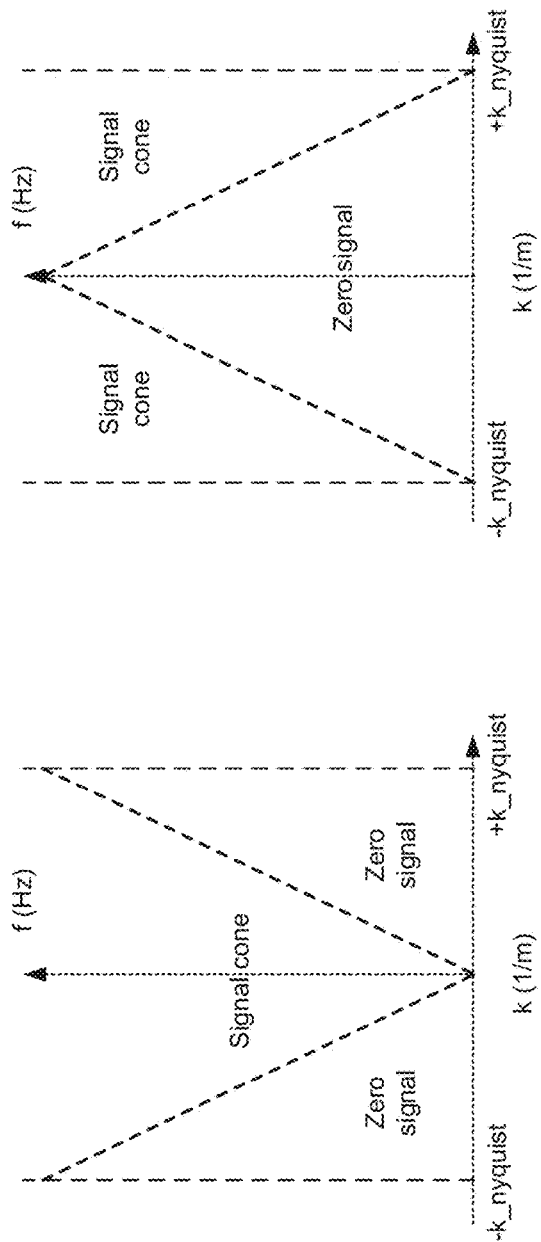
FIG. 1 shows an illustration of what a common receiver gather seismic data set may look like in fk after conventional shooting (left) and flipping polarity on every second shot (right).

In one embodiment, the present method relates to a new way to acquire seismic data based on how seismic sources are utilized. The key realization is that by varying the source signature from shot to shot it is possible to separate data from other signals or noise. In one embodiment of the invention a source boat shoots every second shot with a certain source signature while every intermediate shot is fired with the same source signature but with opposite polarity. After a frequency-wavenumber (fk) transform of such data, for instance sorted into a common receiver gather, the data will populate opposite ends of the k axis in the fk spectrum compared to where a conventionally shot data set with the same source signature for every shot would end up. The theory of this is discussed in detail below. We can exploit this effect for a number of different applications, which are each discussed in greater below:

1. Simultaneous source acquisition.
   The technique described here offers a new way to acquire simultaneous source data. Two or more sources can be fired simultaneously, and the data received from them can be separated, through the use of different varying signature patterns.
2. Seismic interference cancellation.
   By using the present method we can adapt the recorded data signal so as to shift the data originating from the one or more sources from seismic interference. To achieve this, the optimal signature pattern can be adapted as the measurements are taken.
3. Residual shot noise attenuation.
   By choosing the signature variation pattern appropriately, we can use the methodology to isolate residual shot noise that can be removed without affecting the signal at all. Benefits include better signal-to-noise ratio in the acquired data, faster acquisition of seismic data, denser acquisition of seismic data, better low frequency acquisition (low frequencies tend to be most affected by residual shot noise).
4. Seismic data modelling and reverse time migration (RTM).
   Since the method allows multiple sources to be used simultaneously, there can be dramatic efficiency savings when modelling. For instance, if two sources are used, there are immediate efficiency savings are up to a factor of 2.
5. Broad-band seismic acquisition.
   As is discussed further below, once shifted, there may be some aliasing of the data from multiple sources. However, data from multiple sources are always unaliased for low frequencies using our method. We can use purpose built low frequency sources and guarantee that these will not interfere with the acquisition of conventional data.
6. Cost-effective acquisition of shear-wave data.
   Similarly to the RSN application, by choosing the signature variation pattern appropriately, we can use the methodology to isolate the shear-wave arrival from the pressure-wave arrival.
7. Deghosting and source-side gradients for interpolation.
   By applying the varying source signature pattern to different sub-arrays within an airgun array, it is possible to separate the responses from sub-arrays such that horizontal gradients on the source side can be computed. These are useful for source-side deghosting and other applications.

Theory

In the following discussion of the theory behind the present method, techniques that exploit the fact that the fk space in marine seismic data contains significant portions that are empty limited by apparent propagation velocities that cannot be lower than the propagation velocity in water are discussed. However, other domains and geophysical data types may also be used.

The left part of FIG. 1 illustrates a frequency-wavenumber (fk) plot of, for instance, a common shot gather or common-receiver gather from a marine seismic survey. All signal energy sits inside a "signal cone". This is because the slowest possible apparent velocity of any seismic energy will correspond to the propagation velocity of water. Outside this signal cone the data is zero in the fk plot.

The inventors have found that by varying the source signature form shot to shot thereby introducing different shooting patterns it is possible to make much better use of the available fk space. The data may be deliberately aliased.

One example of such a shooting pattern is to shoot all even shot points with a certain source signature and interleave all odd shot points using the same source signature but with opposite polarity. For such a data set, a recorded common receiver gather will have every second trace with flipped polarity, or in other words, the following modulating function has been applied to a conventional data set where all traces had the same source signature:

$$g_1(n)=(-1)^n. \qquad (12)$$

Equation 12 can also be written as $$g_1(n)=e^{i\pi n}. \qquad (13)$$

By applying the function $g_1$ in equation 13 as a modulating function to conventionally recorded (i.e. data recorded without using a varying source signature) data f(n), where n is trace number, before taking a (normalized) discrete Fourier transform:

$$\mathcal{F}_{(f(n))=F(e^{ik})},$$

we obtain $$\mathcal{F}_{(f(n)g_1(n))} = \mathcal{F}_{(f(n)e^{i\pi n})} = F(e^{i(k-\pi)}), \quad (14)$$

which is a standard Fourier transform result (wavenumber shift). That is, modulating a function with equation 12 results in a wavenumber shift by the Nyquist wavenumber.

The right part of FIG. 1 shows what such a data set would look like after an fk transform. Note that the signal cone has now been shifted laterally so that it is centred at the Nyquist wavenumber $k_N$ with half the signal cone on the negative side of the wavenumber axis and the other half on the positive side.

Next we consider the case that we refer to as time dither. In such a case, every second trace may have a time dither T compared to neighbouring traces. The modulating function that we wish to apply can be written as a superposition of several functions with known transforms:

$$g_2(n) = \frac{1}{2}(-1)^n + \frac{1}{2} - \frac{1}{2}(-1)^n e^{i\omega T} + \frac{1}{2} e^{i\omega T}. \quad (15)$$

Note that the exponentials are due to Fourier transforms in a different dimension (Fourier transforms of a time shift T) and are constants in the (space) dimension that we consider.

Equation 15 can be written more compact as, the sum of two modulating functions (one of which is a constant with respect to trace number n):

$$g_2(n) = \frac{1}{2}[1 + e^{i\omega T}] + \frac{1}{2}[1 - e^{i\omega T}](-1)^n. \quad (16)$$

Finally, we can obtain the result:

$$\mathcal{F}(f(n)g_2(n)) = \frac{1}{2}[1 + e^{i\omega T}]F(e^{ik}) + \frac{1}{2}[1 - e^{i\omega T}]F(e^{i(k-\pi)}). \quad (17)$$

Figure 2:
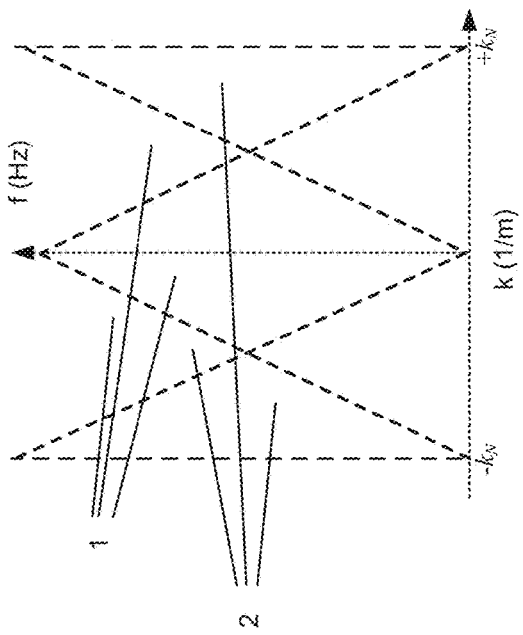
FIG. 2 shows an illustration of what a common receiver gather seismic data set may look like in fk after using a time dither on every second shot.

Equation 17 shows that the seismic data will be mapped in two places. Part of the data will remain at the signal cone centred around k=0 (i.e. the part with frequencies around $\omega=\pi(2n+1)/T$) due to the first term of equation 17 and part of the data will be mapped to a signal cone centred around the Nyquist wavenumber $k_N$ (i.e. the part with frequencies around $$\omega = \frac{2\pi n}{T})$$

due to the second term in equation 17. FIG. 2 illustrates that, in comparison to conventional data (left part of FIG. 1), the data has been partially shifted to $k_N$. Specifically, the data in the signal cone 1 centred around k=0 has not been shifted, but the data in signal cone 2 centred around k=$k_N$ has been shifted.

Thus, from equation 12 it is clear that when polarity flips are used, substantially all the data from the source will be shifted. However, from equation 17 it is clear that when using time dither data will only be partially shifted.

However, the inventors have realised that if one of the terms of equation 17 is known from recorded data, then the other term can be predicted using equation 17. This is a critical observation that makes time dither as useful as flipping polarities.

Since it is not necessary to flip the polarity using time dither as the varying signature, time dither can be performed using conventional sources (such as airguns). Flipping polarity, on the other hand, may require the use of more specialist equipment, such as marine vibroseis.

As can be appreciated, the theory behind the present method may be presented in numerous different ways. Another way of considering the origins of the effect of varying the source signature from shot to shot is that the recorded data then can be considered to consist of a sum of individual datasets, where each data set has one individual/specific source signature. Say, when the source signature is delayed in every second shot, the data can be considered to be the sum of two datasets: one without source delay, and the other with source delay. The full data will have a sampling frequency of $k_s$. The two individual datasets then will have sampling frequency $k_s/2$. This property leads to all the benefits in acquisition, processing, modeling and inversion that have been described in the invention.

Example in Practice

Figure 3:
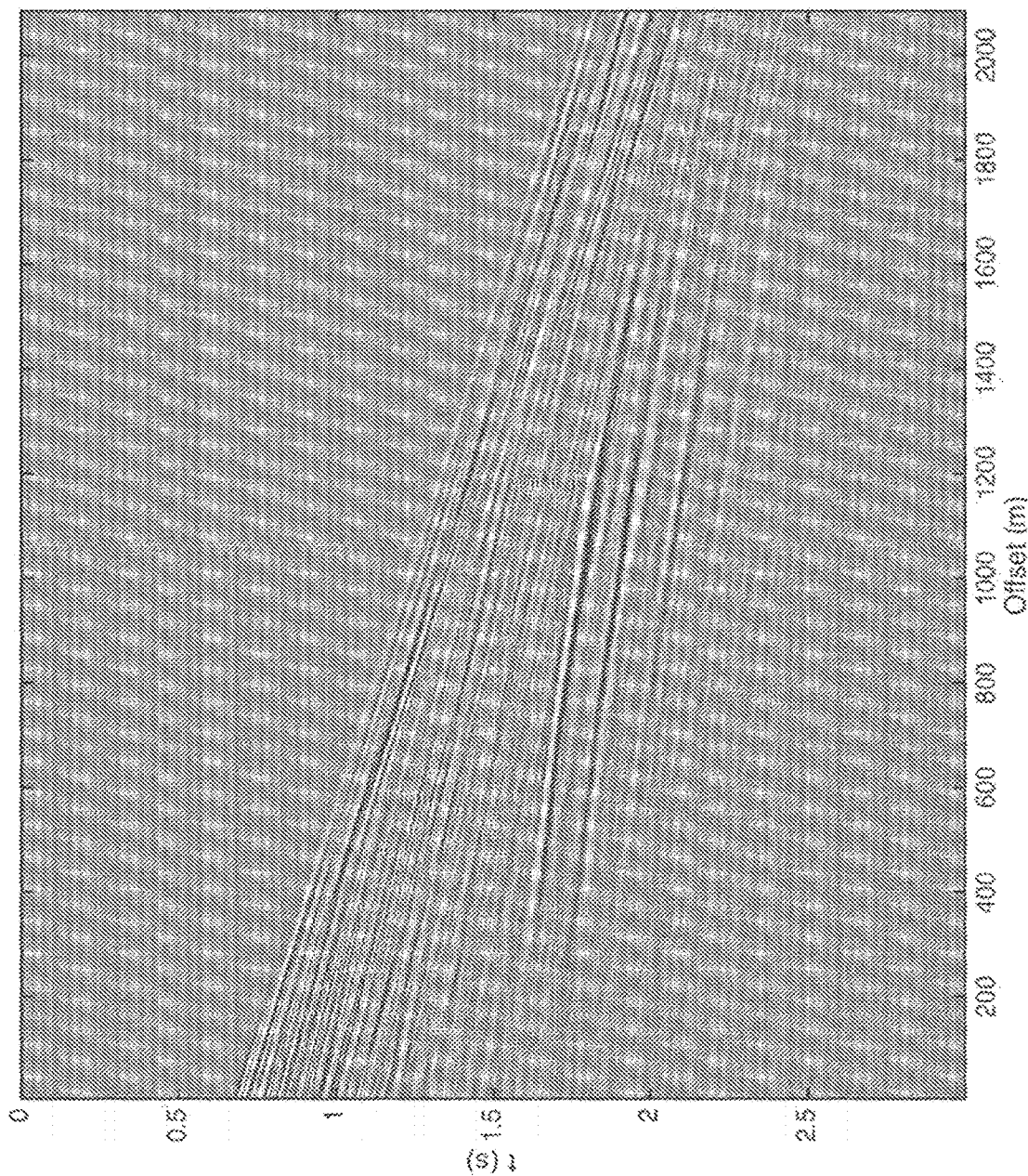
FIG. 3 shows an example acquired data set used to illustrate an embodiment of the present invention.

FIG. 3 shows an example data set from a seismic survey. Although the data comprise a common shot gather sampled at 6.25 m trace spacing, we will manipulate the data as if it were a common receiver gather where every second trace corresponds to a new source location (unrealistically densely sampled at 6.25 m source spacing). Only a small part of the data has been selected such that for instance all near offsets are missing. This will generate some noise artefacts when transforming the data into the fk space.

Figure 4:
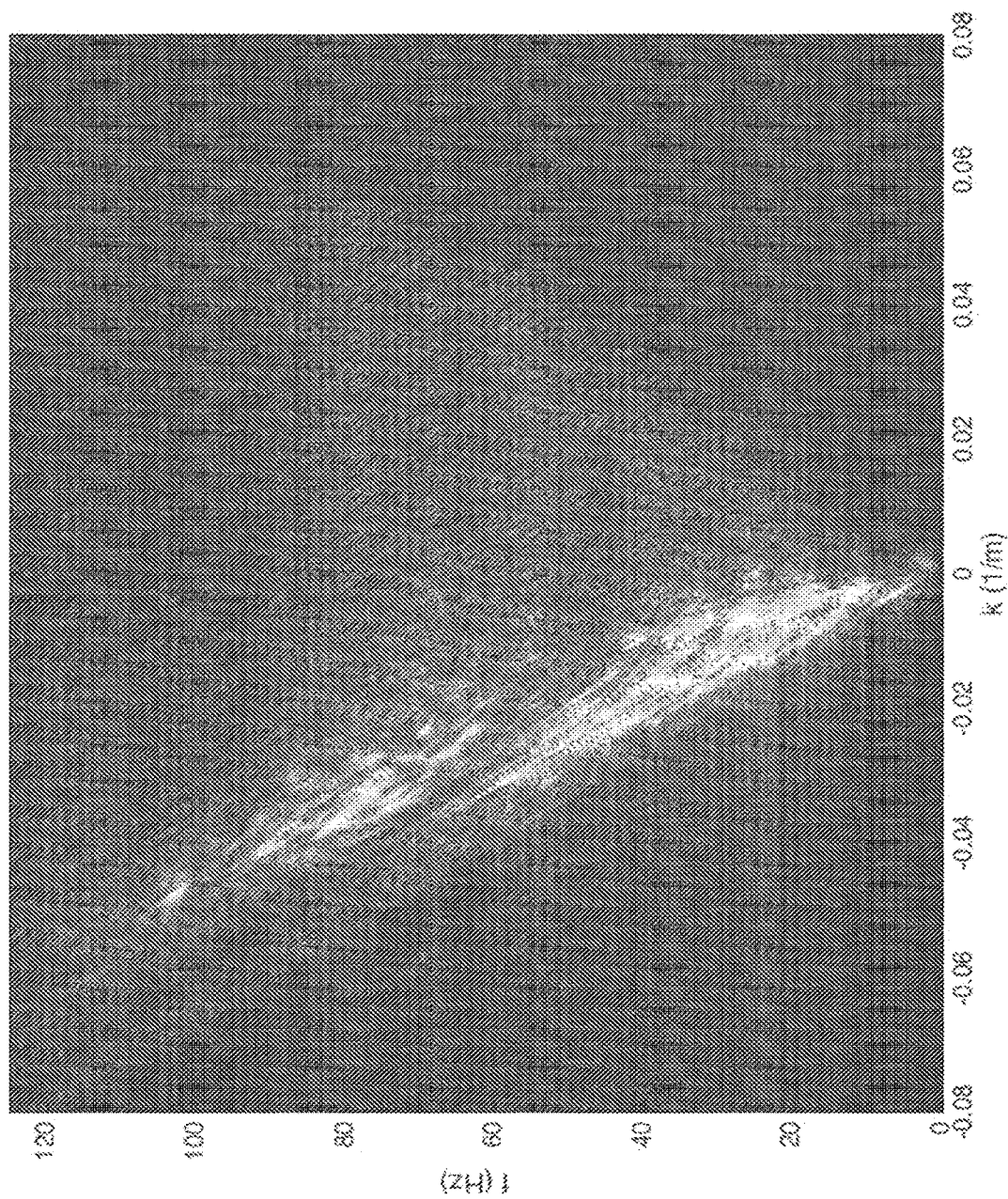
FIG. 4 shows the fk spectrum of the data shown in FIG. 3.

FIG. 4 shows an fk plot of the data in FIG. 3. This is an fk plot of data gathered using a conventional shooting pattern (e.g. the left-hand side of FIG. 1). In this particular case, most of the data arrive with negative wavenumber. This is because the source is located in front of the spread. We can clearly see the outline of a signal cone bounded by the minimum observable apparent velocity of arrivals (water velocity). We see how some energy "bleeds" outside the signal cone. This is an artefact caused by the fact that we chose a small section of data. A more complete data set (such as split spread data set with near and far offsets) would be better focused within the signal cone. However, the data shown here are good enough to serve the purpose of illustrating our concept.

Figure 5:
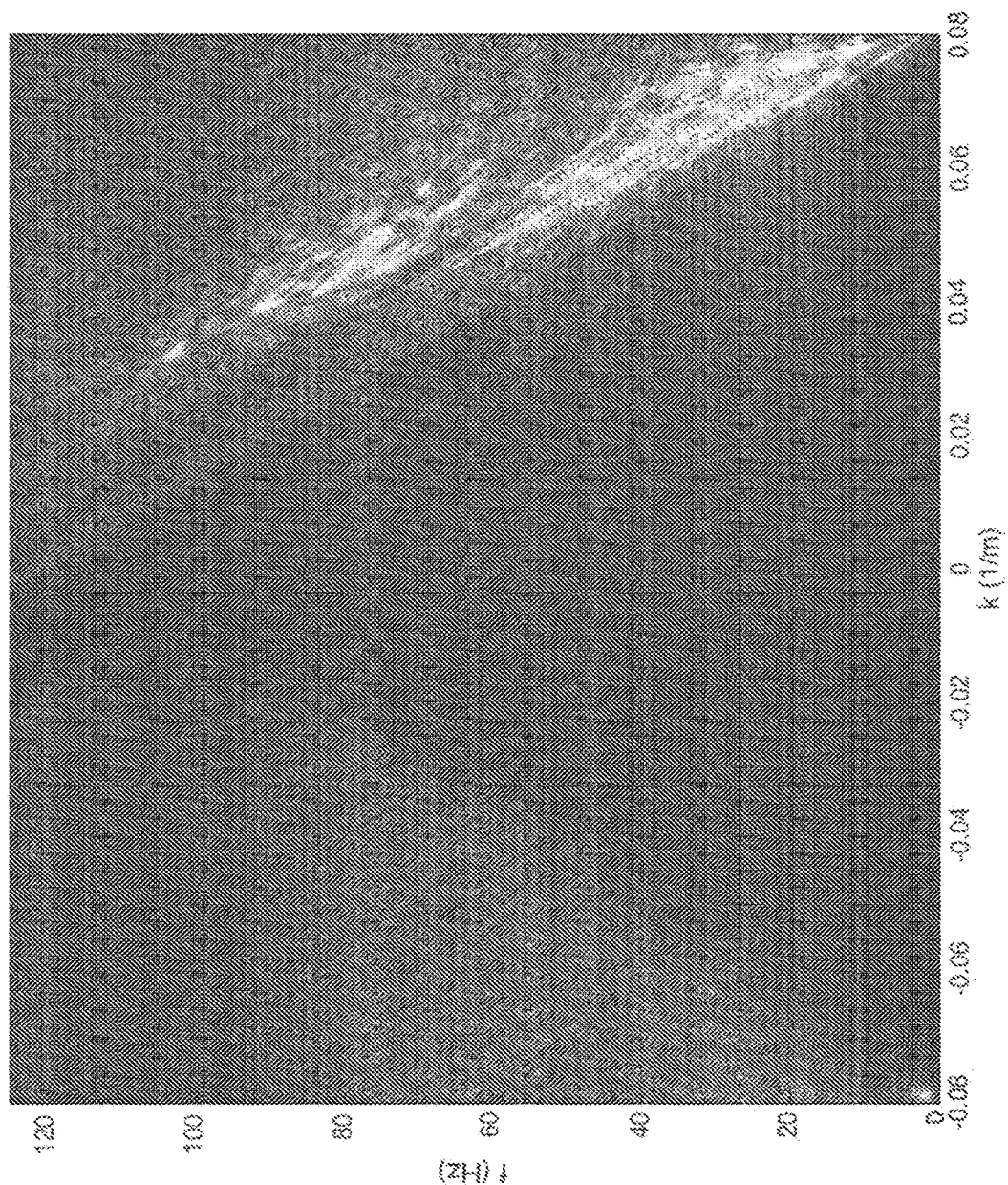
FIG. 5 shows the fk spectrum of the data shown in FIG. 3, but where the polarity of every second trace has been flipped, emulating a survey where every second shot has opposite polarity to the shots right before and after.

FIG. 5 shows an fk plot where every second trace has opposite polarity to every second trace (e.g. +1, −1, +1, −1, +1, −1, etc.). As expected the signal cone has been shifted along the wavenumber axis to be centered around the Nyquist wave number. This is as shown schematically in the right-hand side of FIG. 1.

Figure 6:
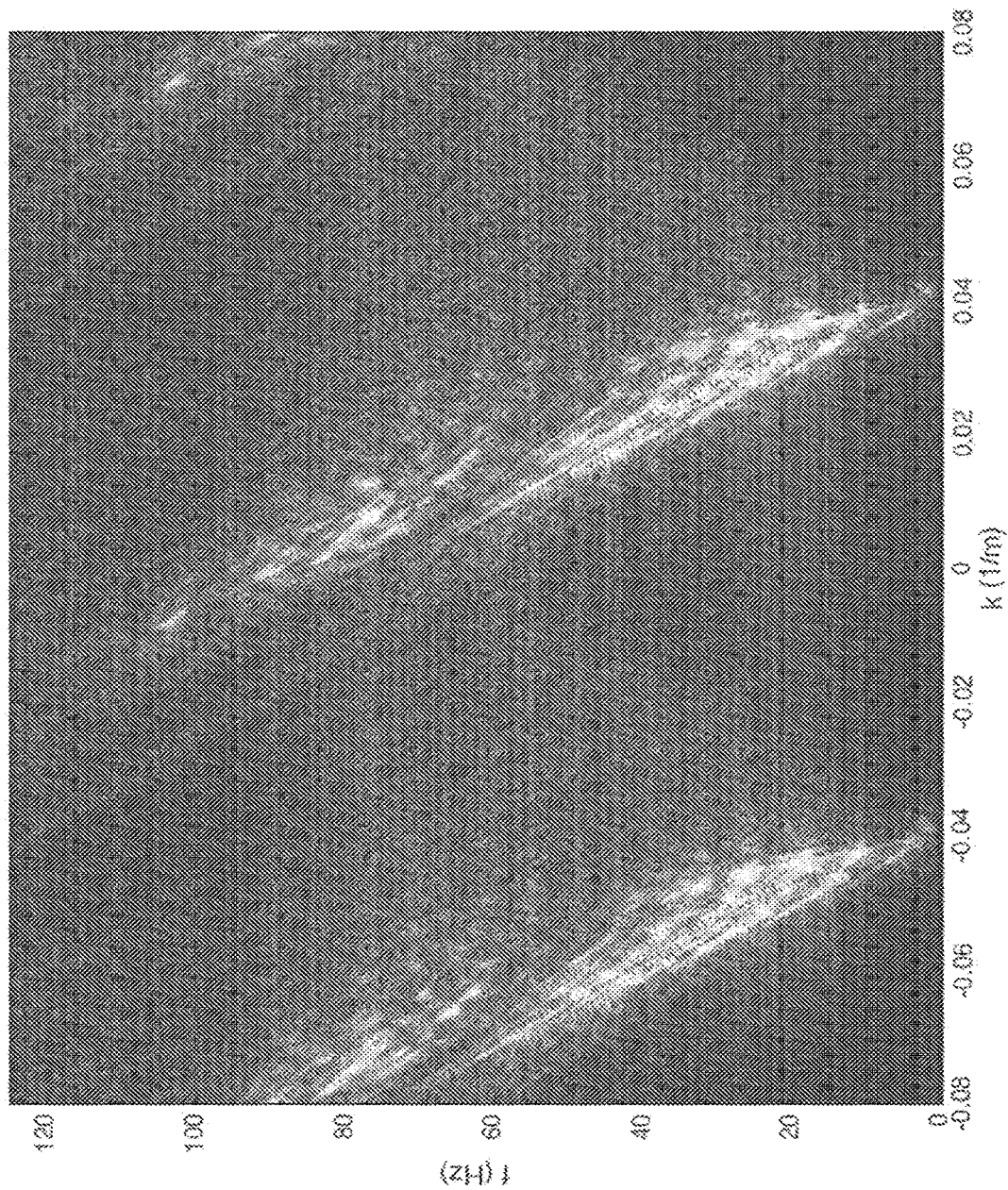
FIG. 6 shows the fk spectrum of the data shown in FIG. 3 but flipping polarity on traces such in the pattern +1, +1, −1, −1, +1, +1, −1, −1, etc., emulating a survey where the polarity of shots are flipped in that pattern.

FIG. 6, shows the fk plot of the same data but the polarity is flipped as follows: +1, +1, −1, −1, +1, +1, −1, −1, etc. It can be seen that the signal cone has been shifted to be centred around positive and negative half of the Nyquist wavenumber.

FIGS. 7, 8, 9 and 10 show fk plots of the data after applying a time shift to every second trace of 10 ms, 20 ms, 40 ms and 200 ms respectively. For instance, the source may be a flip/flop source. Note how part of the data shift from being centred around wavenumber k=0 to the opposite end of the wavenumber axis, i.e., the Nyquist wavenumber. A notch pattern can be seen (in the following referred to as "ghosts", although these have nothing to do with a sea surface ghost) where for certain frequencies all the data is shifted and for certain frequencies none of the data is shifted. This notching can be understood by looking at equation 14. For certain frequencies $$(f = \frac{(2n+1)}{2T}$$

where T is the dither) all the data will be shifted, and for other certain frequencies $$\left(f = \frac{n}{T}\right)$$

none of the data will be shifted.

Figure 11:
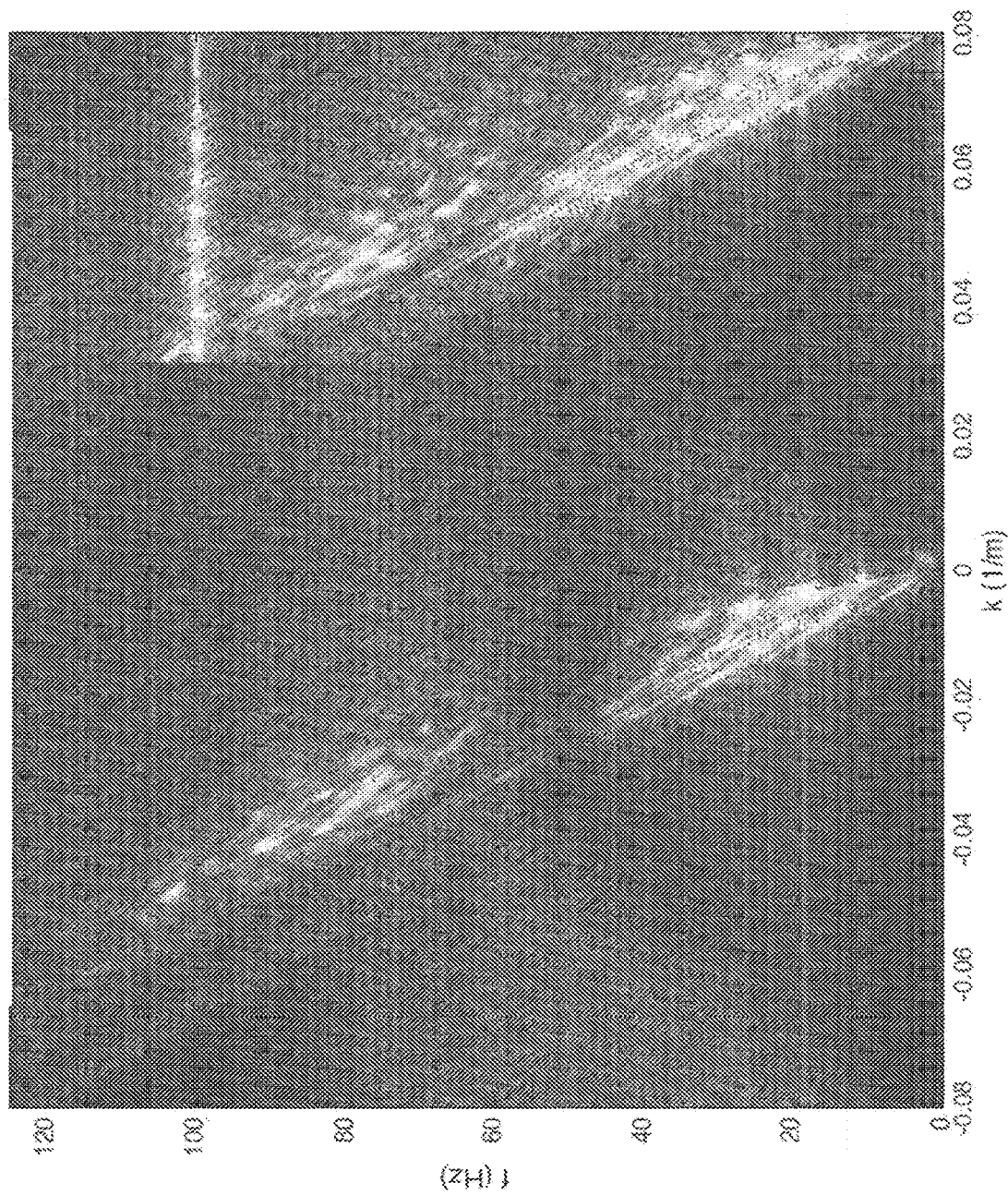
FIG. 11 shows the data of FIG. 7 where equation 17 has been used to properly "deghost" the signal cone centred around the Nyquist wavenumber so that the shifted data now again corresponds to the original data (but shifted to the Nyquist wavenumber).
Figure 12:
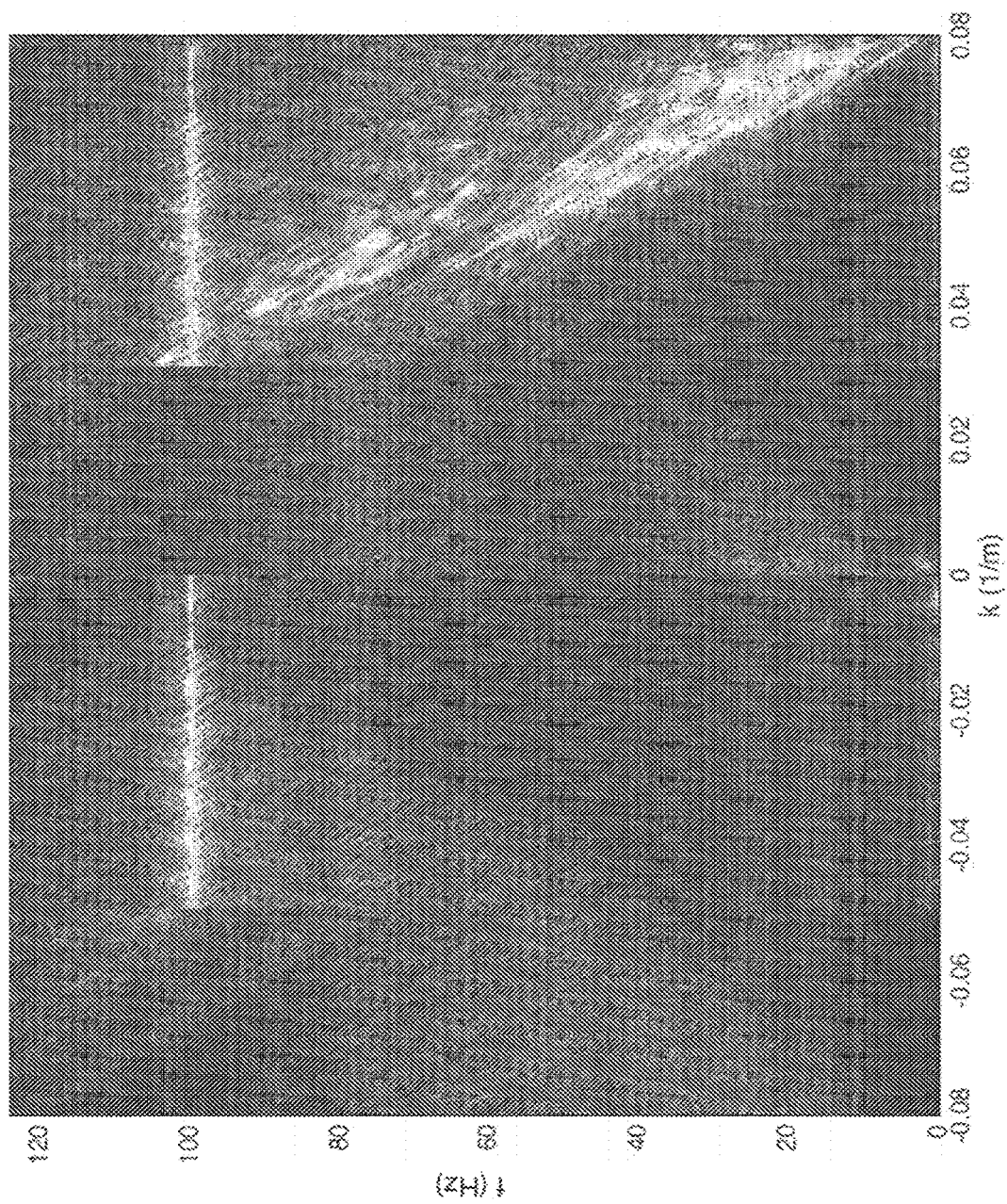
FIG. 12 shows the data shown in FIG. 11 where equation 17 has been used to properly "reghost" the signal cone centred around the Nyquist wavenumber and subtract it from the signal cone centred around k=0. We are left with a data set with one signal cone only that has been shifted to the Nyquist wavenumber.

As discussed above, it is possible to remove these notches, and shift all the data so that is centred around the Nyquist wavenumber. This is shown in FIGS. 11 and 12 where equation 16 is applied to the data with a 10 ms time dither (FIG. 7) to illustrate how we can recover amplitude of a signal cone that has been shifted to the Nyquist wavenumber (even if the signal cone around k=0 is lost or completely masked in noise or other data). This estimate is also used to "reghost" the data (this terms as used here has nothing to do with the sea surface ghost problem) to fully remove all that is left at k=0.

Figure 7:
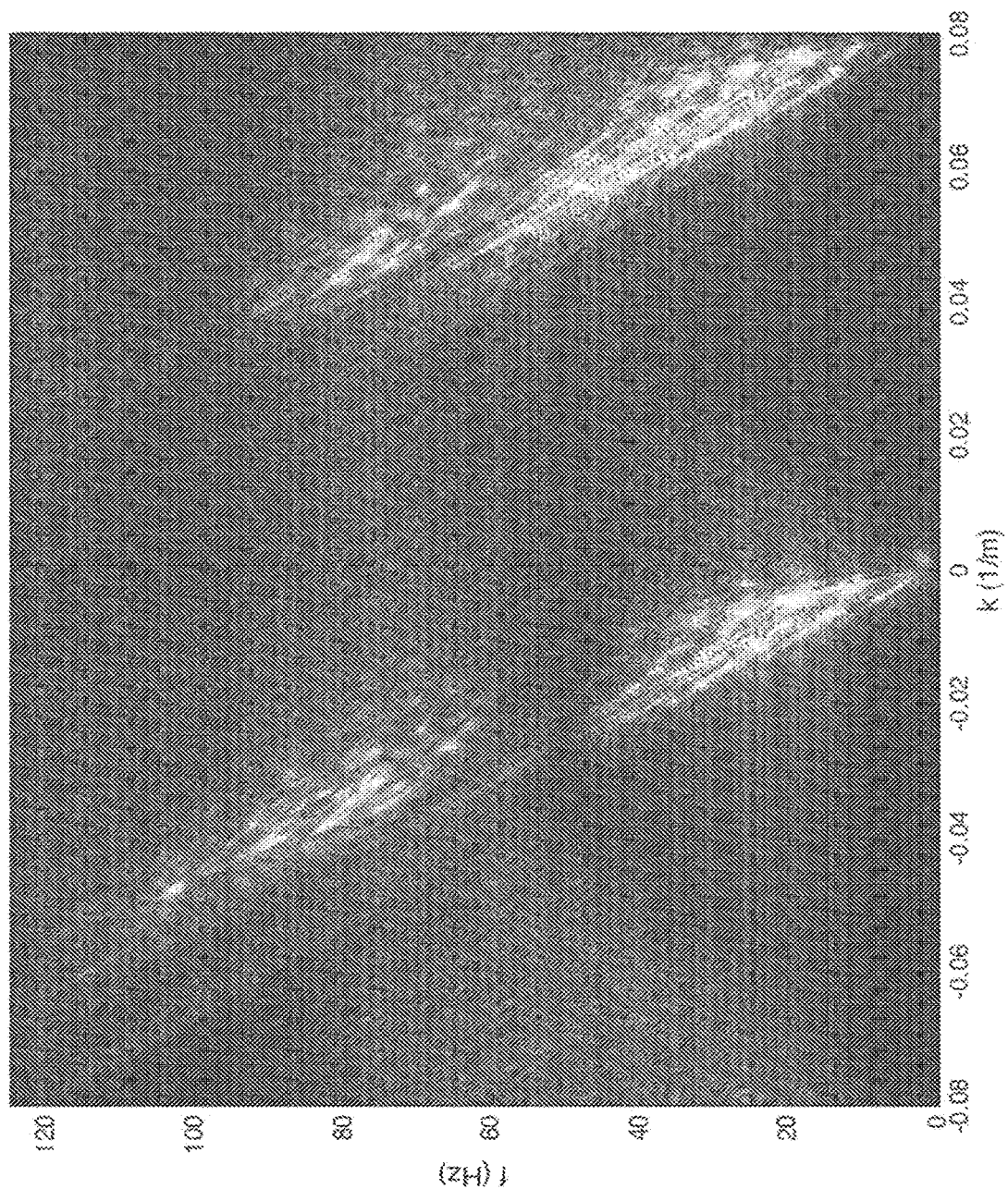
FIG. 7 shows the fk spectrum of the data shown in FIG. 3 but where a time shift of 10 ms has been applied to every second trace, emulating a survey where a time dither of 10 ms on every second shot is used.
Figure 8:
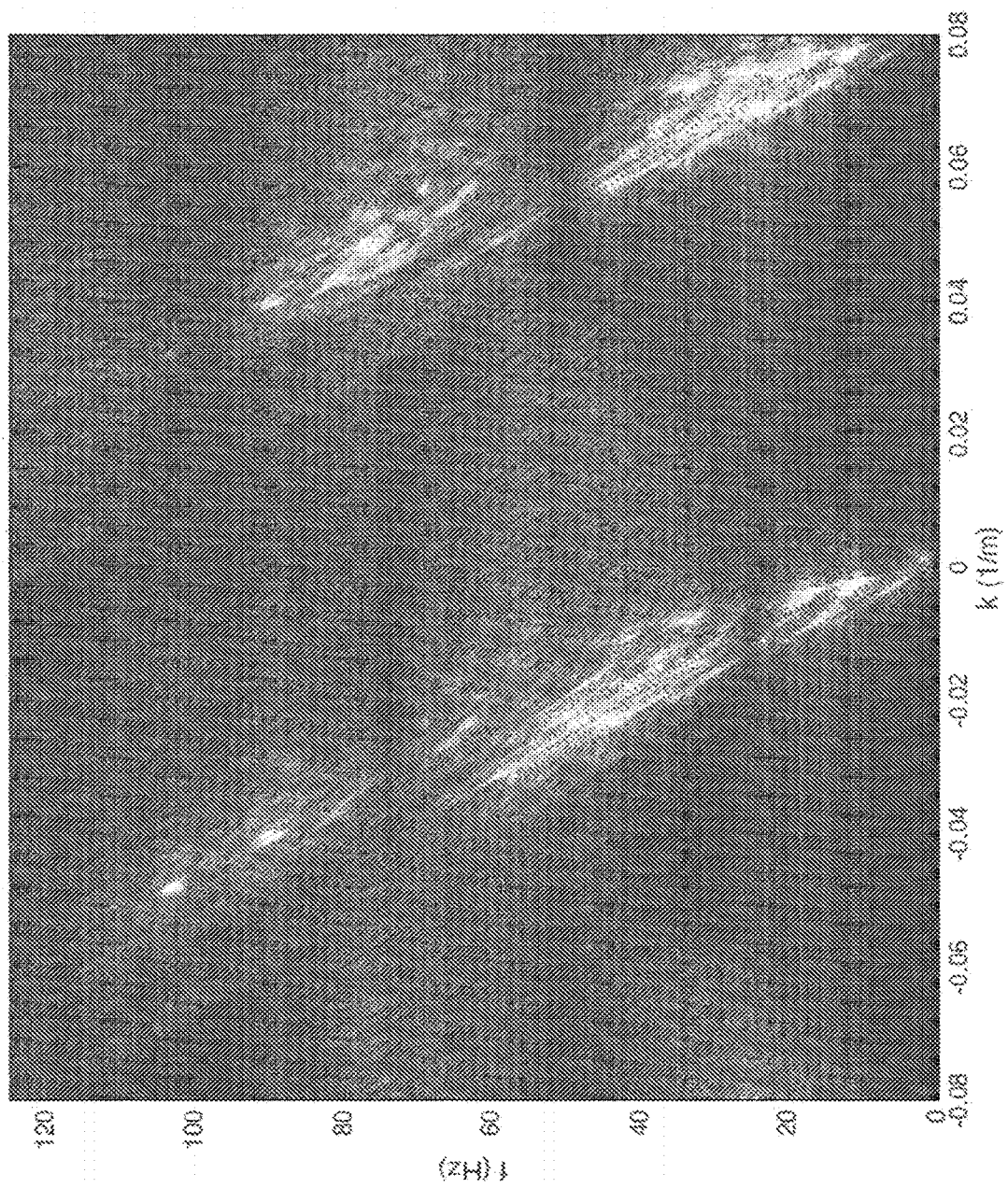
FIG. 8 shows the fk spectrum of the data shown in FIG. 3 but where a time shift of 20 ms has been applied to every second trace, emulating a survey where a time dither of 20 ms on every second shot is used.
Figure 9:
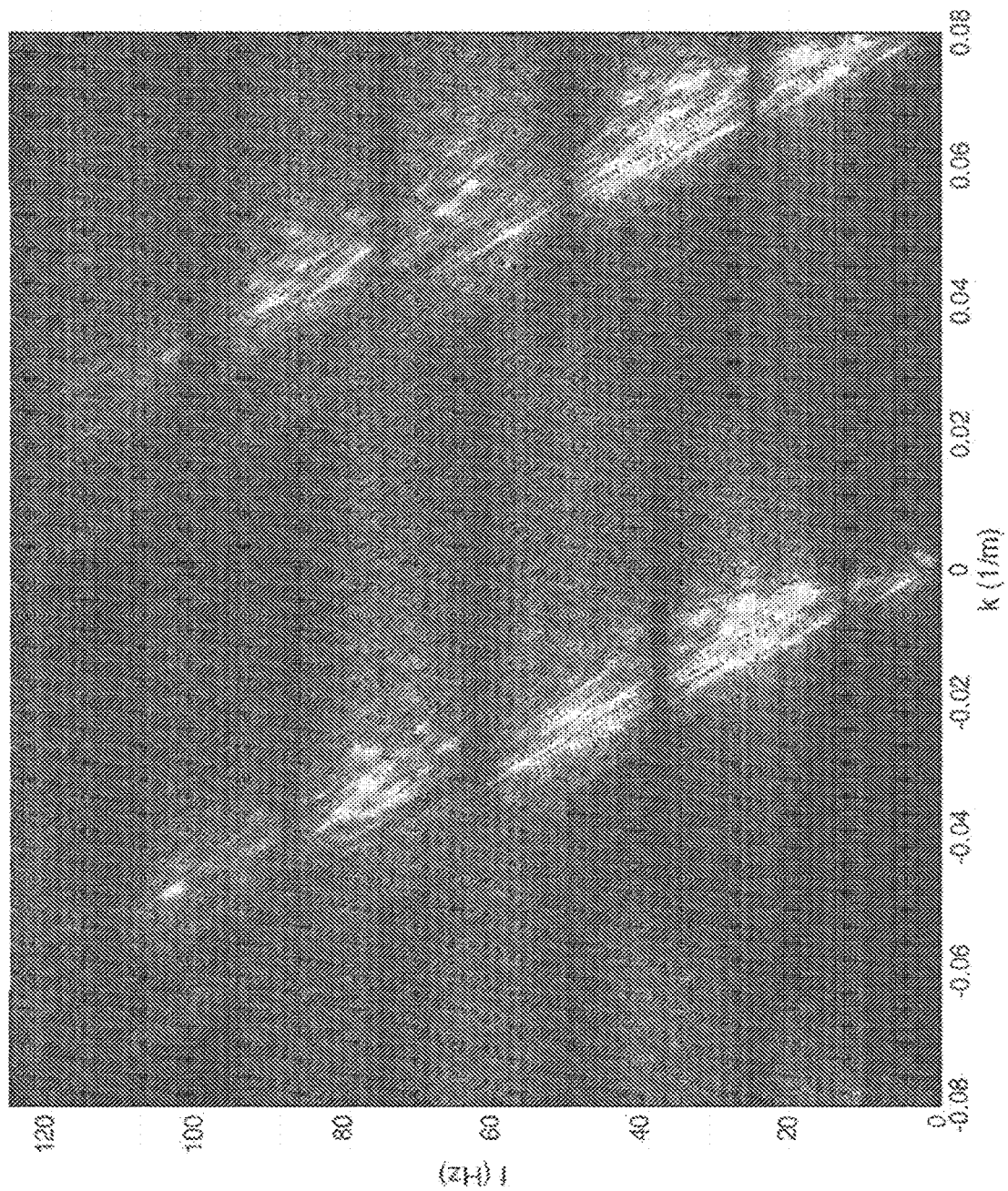
FIG. 9 shows the fk spectrum of the data shown in FIG. 3 but where a time shift of 40 ms has been applied to every second trace, emulating a survey where a time dither of 40 ms on every second shot is used.
Figure 10:
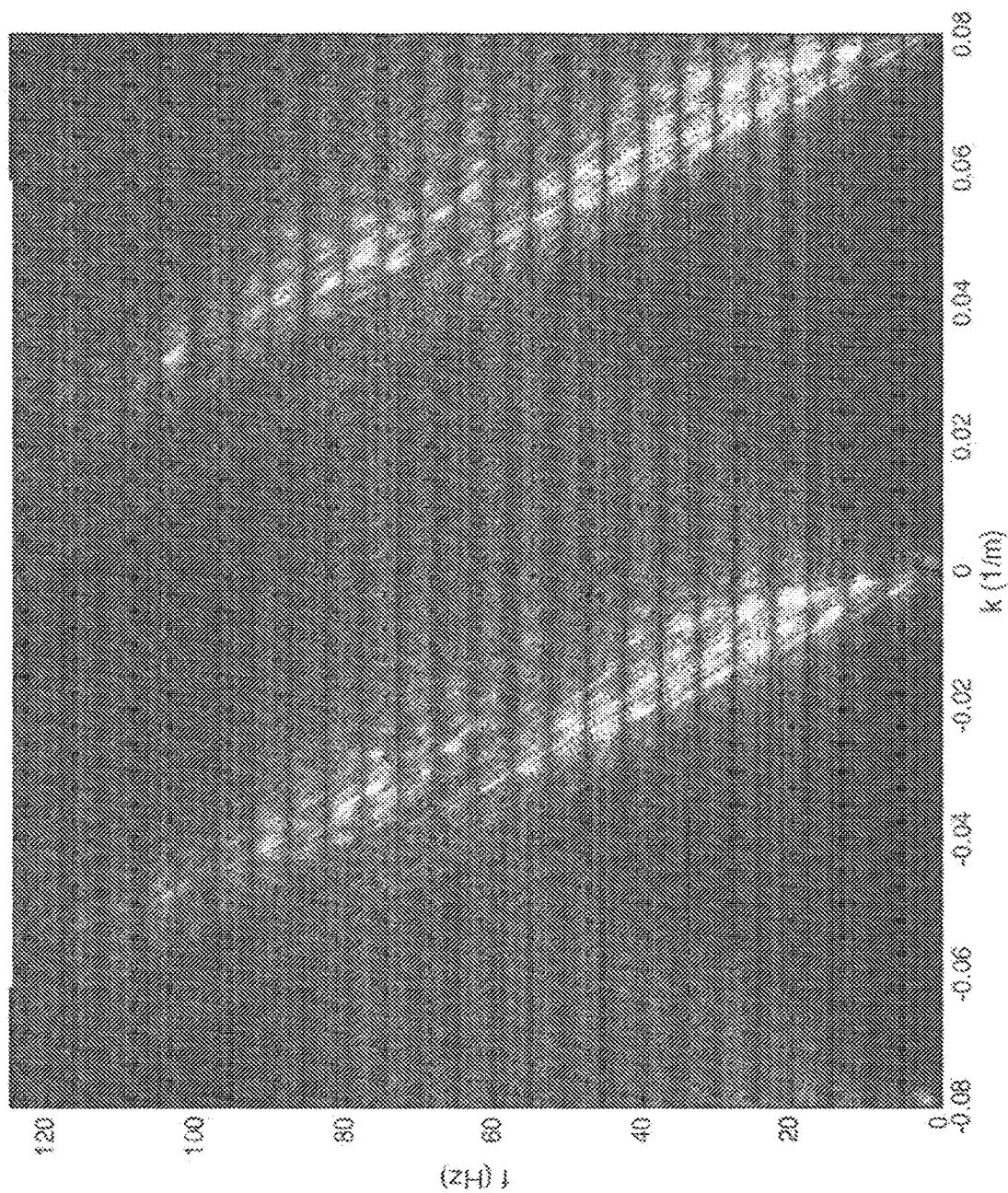
FIG. 10 shows the fk spectrum of the data shown in FIG. 3 but where a time shift of 200 ms has been applied to every second trace, emulating a survey where a time dither of 200 ms on every second shot is used.

FIG. 11 shows the data of FIG. 7 where equation 17 has been used to properly "deghost" the signal cone centred around the Nyquist wavenumber so that the shifted data now again corresponds to the original data (but shifted to the Nyquist wavenumber).

FIG. 12 shows the data shown in FIG. 11 where equation 17 has been used to properly "reghost" the signal cone centred around the Nyquist wavenumber and subtract it from the signal cone centred around k=0. We are left with a data set with one signal cone only that has been shifted to the Nyquist wavenumber.

Thus, using time dither, the data is partially shifted. However, the non-shifted data can be shifted mathematically by understanding the theory behind the shifting.

Now some applications of the present method are described, by way of example only.

1. Simultaneous Source Acquisition

In one embodiment we have two source boats. The first boat shoots every second shot with opposite polarity. The other boat acquires data conventionally (i.e. with no varying signature). The recorded data, in a common receiver gather, will contain a superposition of the two data sets. However, after an fk transform, the data separates to opposite ends of the k axis in the fk spectrum (one cone centred at wavenumber k=0 from the conventional source and the other cone centred at +/− the Nyquist wavenumber from the varying-signature source). The two data sets can now be isolated and inverse transformed back to the space-time domain to obtain the data sets corresponding to each source boat separately. The data set where every second trace has opposite polarity can now be conditioned so that every trace has the same polarity.

In another embodiment, one source is fired without a time shift whereas a second source is fired using a constant time dither (e.g., 10 ms as shown above) for every second shot. The data from the first source will always end up in a signal cone around k=0. However, the data from the second source will be split between two signal cones; one centred around k=0 and one centred around the Nyquist wavenumber in accordance with equation 14. The above theory shows how to:

(1) Fully recover the data from the second source using the signal cone around Nyquist wavenumber only (through what resembles the "deghosting" operation discussed above).

(2) Remove all energy from the second source that was left behind in the signal cone centred around k=0. In other words, the data from the first source is fully recovered.

The concepts of these two embodiments can be generalized to more than two sources and to different varying signatures. For instance, by having a third source with a time dither on two consecutive shots and then no time dither on the next two consecutive shots, then time dithers on the following two consecutive shots, etc., we will obtain data with a new signal cone introduced, centred around half the Nyquist wavenumber.

Note that even though large parts of the fk space are empty in conventionally acquired data, common receiver gathers typically are acquired sparse so that they alias already at frequencies inside the frequency band of interest. Using the technique described here, the two data sets will start to interfere at an even lower frequency because signal cones of the data from the various sources may overlap above a certain threshold frequency value. It is desirable to avoid this as much as possible. The inventors have found several ways to mitigate aliased and/or interfering data:

a. Instead of separating the data in common receive gathers, data could be separated in another domain such as common offset gathers. Common offset gathers are largely flat and apparent velocities will be much higher compared to common receiver gathers and therefore separate much better after an fk transform, i.e. the signal cone will have steeper sides, and hence be narrower, and so will interfere less with other signal cones. As long as the sequence of modulating time shifts from trace to trace is maintained in such a gather, we will separate the data as desired in fk.

b. Since the lowest frequencies in each signal data cone will not overlap with other data cones (due to the shape of the data cone), the lowest frequencies are always unaliased. Dealiasing the aliased higher frequencies can be carried out using known techniques. On such technique "Interpolation with priors" (Spitz, 1991; Ozbek et al., 2009; Vasallo et al., 2010; Ozbek et al., 2010) exploit the fact that (1) a model of an unaliased higher frequency can be predicted from the aliased data, (2) the use of a lower unaliased frequency to compute priors, and (3) an assumption such as that the data contains linear events only in fk. Such dealiasing will be very effective on the types of data that we propose to acquire also in cases of using a greater number of source boats than two.

c. By removing the direct wave, waves guided in the water layer, water bottom refractions, etc. (e.g., by modelling), the width of the signal cone can be narrowed substantially so that the signal cones are better separated in fk and the method will be more effective.

d. If data are recorded far away from a recording location, the signal cone on a common receiver gather will appear narrower as the azimuth range is limited. Finding appropriate gathers to sort simultaneous source data on can be used to ensure that at least one signal cone is narrower and separated better from the other(s).

These mitigation methods are applicable to any application of the present method where multiple sources are used.

2. Seismic Interference Cancellation

Seismic interference is the undesired influence of a different seismic survey conducted in the vicinity of the own seismic survey. Seismic interference (SI) is relatively easy to remove if the interfering seismic energy is arriving in the inline direction of the seismic survey. However, a particularly difficult case is seismic interference arriving from the broad side. Using the technique described in this report we can move the signal to be as far as possible in the fk spectrum from the SI.

SI data often has a low frequency bias compared to the seismic data acquired. In order to remove as much SI as possible, when using time dither a large time shift should preferably be chosen similar to half the dominant period in the SI. We expect the SI application to work particularly well due to the band-limited nature of SI such that one can avoid interference with the data being acquired (low frequencies shifted away from the data along the wavenumber axis will fully fall outside the signal cone of the data acquired).

Using the present method the operator can make sure that the recorded data set will always be acquired at opposite side of the k axis compared to the seismic interference after an fk transform independent of the arrival direction of the seismic interference. The interfering data will therefore be even easier to remove than the currently most benign case of inline interference. The appropriate signature (e.g. the polarity variation or deterministic time shift dithering) sequence can be chosen directly in the field when encountering seismic interference. For instance, if the SI is caused by another vessel shooting seismic waves, it may be possible to select the signature appropriately if the source trigger times of the other vessel are known.

3. Residual Shot Noise Attenuation

Residual shot noise (RSN) is recorded energy that arrives from deep reflections, shear wave conversions, high order multiples or combinations thereof but that were generated from the previous shot. It is a principal form of shot generated noise that limits signal-to-noise in recorded data in cases where other noise types such as ambient noise are weaker. Therefore, in such scenarios, if we can reduce RSN we can either i) shoot seismic data quicker (leading to faster tow speed and therefore shorter records), ii) shoot more densely, or iii) we can always guarantee that the data will be of higher quality if we retain the same towing speed and shot density. The removal of RSN can therefore have a significant impact on the cost efficiency of a survey. Note that RSN is particularly problematic for low frequencies since low frequency data suffer less from attenuation in the Earth's subsurface and therefore require longer times to decay before we are ready to acquire a new uncontaminated shot.

In one embodiment, the following method may be used to isolate residual shot noise when acquiring seismic data using one source boat. First, shoot two consecutive shots with the same polarity. Then shoot two consecutive shots with opposite polarity. Next again shoot two consecutive shots with the same polarity as the first two followed by two with opposite polarity, etc. After acquiring the data, multiply all shots with opposite polarity with −1 (or multiply all shots with positive polarity with −1) such that all traces now have the same polarity. Interestingly, the residual shot noise will have opposite polarity on every second trace. Because of this, after an fk transform, the residual shot noise ends up on the opposite side of the k axis compared to the desired signal and can be efficiently muted.

In another embodiment, flip/flop sources may be used so that the time between consecutive flop shots is always the essentially same and essentially also the same as the time between consecutive flip shots. However, the time between a flip and a flop shot is different compared to the time between a flop and a flip shot.

Figure 13:
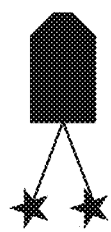
FIG. 13 shows a possible configuration for a flip/flop source to achieve a spatially fully uniform distribution of shot points when time dither is used.

FIG. 13 illustrates how flip/flop data with these types of time shifts can be acquired with fully uniform shot positions. The top of FIG. 13 shows a conventional flip/flop source arrangement where the two stars represent the two airgun arrays that have the same inline offset but are shifted in the cross line direction. In the bottom of FIG. 13 additionally the flip source has been shifted compared to the flop source in the inline direction.

As an example, consider a case where data are acquired with a tow speed of 2.5 m/s. In a conventional flip/flop acquisition data is shot every 10 s so that we obtain a distance between flop shots of 50 m and a distance between flip shots of 50 m as well. Flip and flop shots are perfectly staggered with respect to each other.

In our method a slight time shift between flip and flop shots may be introduced as the time dither. For example, the time between flip and flop shots is 9.8 s and the time between flop and flip shots is 10.2 s. By staggering the sources in the inline direction as illustrated in the lower half of FIG. 10, it is possible to still acquire data on a fully uniform grid. All that we require is to stagger the sources by a distance that corresponds to the distance that the boat moves forward over 0.2 s which in our case is 0.5 m. Note that for the preferred staggering times of say 10 ms or 20 ms, this distance is so short that it can be ignored (2.5 cm in the case of a 10 ms time shift) such that we can continue to tow flip/flop sources as is conventionally done (top of FIG. 13).

Figure 14:
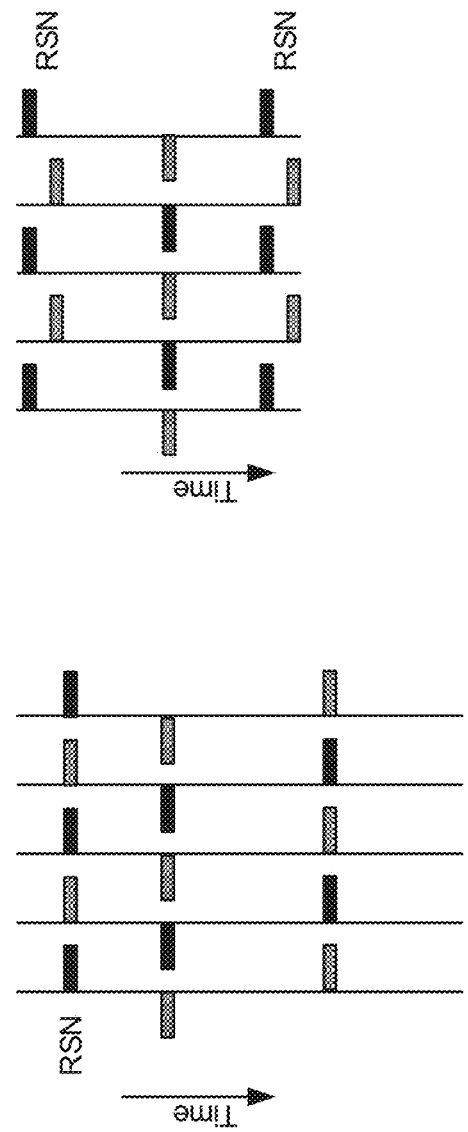
FIG. 14 shows the effect on signal and residual shot noise arrivals after backing off time shifts.

FIG. 14 illustrates a common receiver gather acquired using flip/flop shooting using a conventional technique (left) and the new method described here after backing off the time shift that was introduced during acquisition (right). The case illustrated shows where we tow the sources faster using the new technique such that the record length is shorter on the right hand of FIG. 14 compared to the left. Both signal and shot generated noise (RSN) from flop sources are coloured black whereas arrivals due to the flip source are coloured grey. In the conventional case we note that both signal and RSN are coherent and continuous from shot to shot. However, using the present method we note that whereas the signal becomes continuous from shot to shot, RSN suffers a time shift that is twice that of the original time shift introduced during acquisition. That is, if data were shot with 9.8 s between flip and flop shots and 10.2 s between flop and flip shots, RSN will be shifted by 0.4 s from trace to trace after backing of the original time shift such that the signal is continuous between shots. This effect can be exploited to move RSN away from signal centred around wavenumber $k=0$ to the opposite end of the wavenumber axis (Nyquist wavenumber) as described above. We can now fully remove the RSN without harming the signal after a suitable transform to the fk domain for instance. Note that the optimal choice of staggering times between flip and flop sources will depend on geology and the character of the RSN. It is likely that just as in the case of the SI application, we will benefit from focussing on low frequencies only (just as for SI, RSN tends to be particularly severe at low frequencies). Again, a particular advantage of the low-frequency bias is that we will be much less prone to problems with spatial aliasing.

Whilst this has been discussed in terms of flip/flop sources, the same principle may be used for any source with a periodic varying signature.

4. Seismic Data Modelling and Reverse Time Migration (RTM)

Seismic modelling engines such as finite differences (FD) form the basis of state-of-the-art modelling, imaging and inversion algorithms. Such modelling engines are extremely computational intensive and if so generating synthetic data using more than one shot point at a time could increase the efficiency significantly.

It is clear that using the present method one can immediately recover unaliased synthetic data with two (or more) simultaneous sources using the techniques described herein. This is particularly the case if all but one of the sources only contain low frequencies up to the point where they would start to interfere with the other data, since in this case the generated data is always unaliased and can be recovered for sufficiently low frequencies.

Thus, low-frequency data can be acquired at the same time as a conventional source and so—in terms of computing power—are effectively acquired for free. The low-frequency data is of low enough frequency so that that it will not interfere with any of the data from the other low frequency source(s) or the conventional source(s).

Further, the above-discussed techniques relating to minimising interference and aliasing can be used to mitigate interference and aliasing issues between sources.

5. Broadband Seismic Acquisition

In order to perform broadband acquisition, it has been proposed to use a dedicated low frequency source, such as a "sub-woofer" in combination with a conventional source (Berkhout (2012)). Using our invention we can acquire such "sub-woofer data" simultaneously with a conventional source that cover a little low frequencies but mostly intermediate and high frequencies. Acquiring the "sub-woofer data" flipping polarity at every second shot point can therefore be done without interfering with the conventional data at all (similarly to the modelling application described earlier). Alternatively, time dither could be used.

Depending on the maximum frequency of the "sub-woofer data", we can also choose to acquire it sparser without interfering with the conventionally shot data or without aliasing the "sub-woofer data" themselves. However, marine vibroseis are known to be inefficient at emitting low frequencies. Therefore, even if we have a purpose built low-frequency marine vibroseis we will likely benefit from shooting often to compensate for the weaker output.

Thus, the multiple simultaneous sources can comprise at least one low frequency source and at least one conventional source.

6. Cost-Effective Acquisition of Shear-Wave Data

Converted wave (shear) data can be acquired much more efficiently using the time dither, or polarity flipping, concept enabling record lengths that are similar to those of conventional pressure data. The procedure and benefits are analogous to those described under the RSN application outlined above.

Note that both RSN and shear waves occur late in the record and in both cases the apparent wavenumbers are limited (waves mostly arrive close to the vertical) such that time dither will work particularly well.

In the case of pressure and shear data acquisition we also benefit from the fact that shear data tend to be mostly arriving on the horizontal component in seabed recordings thus leading to more favourable signal-to-noise ratio in the separation process. Likewise pressure data dominate the pressure and the Z recordings.

Finally, just as in the RSN application, we benefit from the fact that the recorded shear arrivals typically lack high frequencies and therefore are limited to lower apparent wavenumbers, and so are less likely to interfere.

7. Deghosting and Source-Side Gradients for Interpolation

By applying the dithering sequences to different sub-arrays within an airgun array, it is possible to separate the responses from sub-arrays such that horizontal gradients on the source side can be computed. These are useful for source-side deghosting and other applications.

If the simultaneous source concept is used for sources (or sub-arrays) that are closely located to each other, one can estimate spatial derivatives in the vertical and horizontal directions. Note that we can use different signature sequences to have three (or even more sub-arrays) firing at the same time with different dithers that then can be separated. From these data spatial derivatives of the wavefield on the source side can be computed for a range of applications, for instance for: vertical derivative can be used for source-side deghosting and/or horizontal derivatives can be used for spatial reconstruction of the wavefield on the source side (Robertsson et al., 2008).

Essentially, in this case, the array (or sub array) is treated as a comprising multiple sources. If the signature of each source or each sub array is varied in accordance with the present method, it is possible to know what recorded data came from each source (or sub array). Knowing this can greatly ease deghosting and source-side gradient calculations.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

REFERENCES

Berkhout, A. J. (2012). Blended acquisition with dispersed source arrays. Geophysics, 77(4), A19-A23.

Özbek, A., Özdemir, A. K., & Vassallo, M. (2009, January). Interpolation by matching pursuit. In 2009 SEG Annual Meeting. Society of Exploration Geophysicists.

Özbek, A., Vassallo, M., Özdemir, K., van Manen, D. J., & Eggenberger, K. (2010). Crossline wavefield reconstruction from multicomponent streamer data: Part 2—Joint interpolation and 3D up/down separation by generalized matching pursuit. Geophysics, 75(6), WB69-WB85.

Robertsson, J. O. A., I. Moore, M. Vassallo, A. K. Özdemir, D. J. van Manen and A. Özbek, 2008, On the use of multicomponent streamer recordings for reconstruction of pressure wavefields in the crossline direction: Geophysics, 73, A45-A49.

Spitz, S. (1991). Seismic trace interpolation in the FX domain. Geophysics, 56(6), 785-794.

Vassallo, M., Özbek, A., Özdemir, K., & Eggenberger, K. (2010). Crossline wavefield reconstruction from multicomponent streamer data: Part 1—Multichannel interpolation by matching pursuit (MIMAP) using pressure and its crossline gradient. Geophysics, 75(6), WB53-WB67.

Yilmaz (2001): Seismic Data Analysis: Processing, Inversion, and Interpretation of Seismic Data, Investigations in Geophysics: SEG

We claim:

1. A method of generating geophysical data using at least one source, the method comprising:
    generating a geophysical wavefield with a varying signature using at least one source,
    wherein the signature is varied in a periodic pattern;
    recording geophysical energy to produce geophysical data using at least one receiver, the geophysical energy comprising the propagating geophysical wavefield generated at the at least one source; and
    transforming the geophysical data into another domain;
    wherein the other domain is a domain such that at least some of the geophysical data is shifted to a location that is different to the location in the other domain where the at least some of the geophysical data would have been had the varying signature not been used.

2. The method as claimed in claim 1, wherein the at least one source is an airgun source, an airgun source array, a watergun source, a flip/flop source, or an electric and/or magnetic source.

3. The method as claimed in claim 1, further comprising:
    isolating the geophysical data originating from the propagating geophysical wavefield generated at the at least one source from any other geophysical data that may be present in the other domain.

4. The method as claimed in claim 3, further comprising transforming the isolated geophysical data back into the domain in which the geophysical data was recorded.

5. The method as claimed in claim 3, further comprising:
    conditioning the isolated data so as to effectively remove the varying signature pattern from the recorded geophysical data.

6. The method as claimed in claim 5, wherein the conditioning step occurs in the other domain or in the domain in which the geophysical data was recorded.

7. The method as claimed in claim 1, further comprising:
    recording geophysical energy to produce geophysical data using at least one receiver, the geophysical energy comprising the propagating geophysical wavefield generated at the at least one source; and
    isolating the geophysical data originating from the propagating geophysical wavefield generated at the at least one source from any other geophysical data that may be present in the other domain.

8. The method as claimed in claim 1, wherein the periodic pattern is such that, after transforming the recorded geophysical data into another appropriate domain, a first portion of the recorded geophysical data originating from the propagating geophysical wavefield generated by the at least one source would be shifted relative to a second portion of the recorded geophysical data originating from the propagating geophysical wavefield generated by the at least one source, and the method comprises:
    identifying the first portion; and
    processing the data to calculate a full data signal at the shifted location of the first portion using the identified first portion and/or to remove the second portion of the data using the identified first portion.

9. The method as claimed in claim 1, wherein the signature is varied using time dither and the varying time dither is that every second geophysical wavefield generated by the at least one source is triggered with a constant delay of time T.

10. The method as claimed in claim 1, wherein the signature is varied by varying the polarity and the varying polarity is that every second geophysical wavefield generated by the at least one source has opposite polarity.

11. The method as claimed in claim 1, comprising selecting the varying signature of the at least one source such that, once geophysical energy comprising the generated geophysical wavefield and another signal is recorded and the recorded geophysical data is transformed into another appropriate domain, the recorded geophysical data originating from the generated geophysical wavefield would be shifted away from recorded geophysical data originating from the other signal.

12. The method as claimed in claim 11, wherein the other signal arises from noise, interference, or one or more other sources.

13. The method as claimed in claim 1, wherein at least two sources are used to simultaneously generate geophysical wavefields, the first source having a varying signature in a periodic and the second source having no varying signature in a periodic, or having a different varying signature in a periodic pattern and/or wherein the method comprises selecting the varying signature such that, once the geophysical data is recorded and transformed into another domain, a pressure wave portion of the geophysical data will be at least partially shifted away from a shear wave portion of the geophysical data.

14. The method as claimed in claim 1, the method comprising selecting the varying signature such that, once the recorded geophysical data is recorded and transformed into another domain, the portion of the recorded geophysical data originating from the generated wavefield would be at least partially shifted away from an interference portion of the recorded geophysical data.

15. The method as claimed in claim 14, wherein the signature is varied using time dither, and wherein the interference portion has a dominant frequency, and the method comprises using a time dither of approximately the same as, a half of or a quarter of the period of the dominant frequency.

16. The method as claimed in claim 1, the method comprising selecting the varying signature such that, once the geophysical data is recorded and transformed into another domain, a residual shot noise portion of the recorded geophysical data would be at least partially shifted away from the portion of the geophysical data originating from the generated geophysical wavefield.

17. The method as claimed in claim 16, wherein the signature is varied using time dither, and wherein the residual shot noise portion has a dominant frequency, and the method comprises using a time dither of approximately the same as, a half of or a quarter of the period of the dominant frequency of the residual shot noise.

18. The method as claimed in claim 16, wherein the signature is varied by varying the polarity, and wherein the residual shot noise portion has a dominant frequency, and the periodic pattern of the varying polarity of sequentially generated geophysical wavefields is: a second generated geophysical wavefield having the same polarity as a first generated geophysical wavefield, a third generated geophysical wavefield having opposite polarity to the second generated geophysical wavefield, a fourth generated geophysical wavefield having the same polarity as the third generated geophysical wavefield, a fifth generated geophysical wavefield having opposite polarity to the fourth generated geophysical wavefield, a sixth generated geophysical wavefield having the same polarity as the fifth generated geophysical wavefield, (i.e. +1, +1, −1, −1, +1, +1, −1, −1).

19. The method as claimed in claim 1, wherein the time between generating subsequent geophysical wavefields is less than the time taken for the geophysical wavefield energy originating from each generated geophysical wavefield to be recorded by the receiver, the method comprising identifying the data in a given trace originating from a geophysical wavefield generated previously to the trigger time of the given trace, and adding this identified data to data on a previous trace originating from the same geophysical wavefield.

20. The method as claimed in claim 1, comprising reducing the width of the data signal originating from the at least one source in the other domain.

21. The method as claimed in claim 20, when the geophysical wavefield, energy and/or data is a seismic wavefield, energy and/or data, comprising removing low-speed waves of the recorded wavefield.

22. The method as claimed in claim 1 used in a modeling, imaging or inversion method; and/or wherein the geophysical data is 2D or 3D geophysical data; and/or wherein the geophysical wavefield, energy and/or data is a seismic wavefield, energy and/or data, or the geophysical wavefield, energy and/or data is a controlled source electromagnetic wavefield, energy and/or data; and/or wherein the transform may be a Fourier, tau-p or radon transform.

23. A system for generating geophysical data comprising:
at least one source for generating a geophysical wavefield with a varying signature, wherein the source is configured to vary the signature of the geophysical wavefield in a periodic pattern; at least one receiver for recording geophysical energy, the geophysical energy comprising the propagating geophysical wavefield generated at the at least one source; and
a processor for transforming the recorded geophysical data into another domain, wherein the other domain is a domain such that at least some of the recorded geophysical data is shifted to a location that is different to the location in the other domain where the at least some of the geophysical data would have been had the varying signature not been used.

24. The system as claimed in claim 23, comprising:
a processor for isolating the geophysical data originating from the propagating geophysical wavefield generated at the at least one source from any other geophysical data that may be present in the other domain, wherein the processor comprises a filter for filtering the recorded data.

25. The system as claimed in claim 23, comprising at least two sources each for generating a geophysical wavefield, the first source being configured to vary the signature of its geophysical wavefield in a periodic pattern, and the second source being configured not to vary the signature of its geophysical wavefield in a periodic pattern, or configured to vary the signature of its geophysical wavefield in a different periodic pattern.

26. The system as claimed in claim 23 configured to perform the method of claim 1.

* * * * *